United States Patent
Gao et al.

(10) Patent No.: US 11,775,878 B2
(45) Date of Patent: Oct. 3, 2023

(54) AUTOMATED MACHINE LEARNING TEST SYSTEM

(71) Applicant: SAS Institute Inc., Cary, NC (US)

(72) Inventors: Yan Gao, Cary, NC (US); Joshua David Griffin, Harrisburg, NC (US); Yu-Min Lin, Raleigh, NC (US); Bengt Wisen Pederson, Durham, NC (US); Ricky Dee Tharrington, Jr., Raleigh, NC (US); Pei-Yi Tan, New Smyrna Beach, FL (US); Raymond Eugene Wright, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/523,607

(22) Filed: Nov. 10, 2021

(65) Prior Publication Data
US 2022/0198340 A1 Jun. 23, 2022

Related U.S. Application Data

(60) Provisional application No. 63/128,855, filed on Dec. 22, 2020.

(51) Int. Cl.
*G06N 20/20* (2019.01)
*G06N 7/01* (2023.01)

(52) U.S. Cl.
CPC ............... *G06N 20/20* (2019.01); *G06N 7/01* (2023.01)

(58) Field of Classification Search
CPC .............................. G06N 7/005; G06N 20/20
See application file for complete search history.

(56) References Cited

U.S. PATENT DOCUMENTS

| | | | |
|---|---|---|---|
| 6,026,397 A | 2/2000 | Sheppard | |
| 6,249,882 B1 | 6/2001 | Testardi | |
| (Continued) | | | |

FOREIGN PATENT DOCUMENTS

| CA | 2977042 | | 8/2016 |
|---|---|---|---|
| CN | 103810171 | | 2/2017 |
| CN | 110377492 | A | 10/2019 |
| CN | 111400198 | | 8/2020 |
| DE | 102019210562 | A1 * | 1/2021 |

(Continued)

OTHER PUBLICATIONS

Patel, Dhaval, et al. "Smart-ML: A System for Machine Learning Model Exploration using Pipeline Graph." 2020 IEEE International Conference on Big Data (Big Data). IEEE (Year: 2020).*

(Continued)

*Primary Examiner* — Kamran Afshar
*Assistant Examiner* — Adam C Standke
(74) *Attorney, Agent, or Firm* — Bell & Manning, LLC

(57) ABSTRACT

A computing device selects new test configurations for testing software. Software under test is executed with first test configurations to generate a test result for each test configuration. Each test configuration includes a value for each test parameter where each test parameter is an input to the software under test. A predictive model is trained using each test configuration of the first test configurations in association with the test result generated for each test configuration based on an objective function value. The predictive model is executed with second test configurations to predict the test result for each test configuration of the second test configurations. Test configurations are selected from the second test configurations based on the predicted test results to define third test configurations. The software under test is executed with the defined third test configurations to generate the test result for each test configuration of the third test configurations.

30 Claims, 11 Drawing Sheets

(56) References Cited

U.S. PATENT DOCUMENTS

| | | | |
|---|---|---|---|
| 7,644,334 | B2 | 1/2010 | Hickman et al. |
| 7,809,988 | B1 | 10/2010 | Portal et al. |
| 8,136,104 | B2 | 3/2012 | Papakipos et al. |
| 8,276,123 | B1 | 9/2012 | Deng et al. |
| 8,365,186 | B2 | 1/2013 | Faraj et al. |
| 8,370,809 | B2 | 2/2013 | Lawrance et al. |
| 8,417,998 | B2 | 4/2013 | Thomas et al. |
| 8,429,617 | B2 | 4/2013 | Demetriou et al. |
| 8,443,349 | B2 | 5/2013 | Papakipos et al. |
| 8,954,309 | B2 * | 2/2015 | B'Far ............. G06F 11/3447 703/22 |
| 8,965,944 | B2 | 2/2015 | Ziv |
| 9,098,326 | B1 | 8/2015 | Martin et al. |
| 9,330,362 | B2 | 5/2016 | Bilenko et al. |
| 9,558,036 | B1 | 1/2017 | Martin et al. |
| 9,858,529 | B2 | 1/2018 | Adams et al. |
| 9,864,953 | B2 | 1/2018 | Adams et al. |
| 10,074,054 | B2 | 9/2018 | Adams et al. |
| 10,346,757 | B2 | 7/2019 | Adams et al. |
| 10,360,517 | B2 | 7/2019 | Koch et al. |
| 10,452,526 | B2 | 10/2019 | Rajpal et al. |
| 10,592,398 | B1 * | 3/2020 | Dwarakanath ...... G06F 11/3688 |
| 10,592,554 | B1 | 3/2020 | Merritt |
| 10,600,005 | B2 | 3/2020 | Gunes et al. |
| 10,719,301 | B1 | 7/2020 | Dasgupta et al. |
| 10,832,174 | B1 | 11/2020 | Chen et al. |
| 10,878,345 | B2 | 12/2020 | Lekivetz et al. |
| 10,963,802 | B1 | 3/2021 | Gardner et al. |
| 11,093,833 | B1 | 8/2021 | Gardner et al. |
| 11,151,480 | B1 | 10/2021 | Golovidov et al. |
| 2004/0201588 | A1 | 10/2004 | Meanor et al. |
| 2014/0033093 | A1 | 6/2014 | Brauninger et al. |
| 2014/0358831 | A1 * | 12/2014 | Adams ................ G06N 7/01 706/20 |
| 2016/0085428 | A1 | 3/2016 | Ashby |
| 2016/0098176 | A1 | 4/2016 | Cervelli et al. |
| 2017/0169329 | A1 * | 6/2017 | Doniwa .............. G06N 3/08 |
| 2018/0240041 | A1 | 8/2018 | Koch et al. |
| 2018/0285186 | A1 | 10/2018 | Godefroid et al. |
| 2019/0065182 | A1 * | 2/2019 | Hsiung ............. G06F 11/3684 |
| 2019/0318248 | A1 | 10/2019 | Moreira-Matias et al. |
| 2020/0065712 | A1 * | 2/2020 | Wang .............. G06N 20/20 |
| 2020/0097847 | A1 | 3/2020 | Convertino et al. |
| 2020/0099733 | A1 | 3/2020 | Chu et al. |
| 2020/0161634 | A1 | 5/2020 | Kim et al. |
| 2020/0167691 | A1 | 5/2020 | Golovin et al. |
| 2020/0201897 | A1 | 6/2020 | Palanciuc et al. |
| 2020/0211716 | A1 | 7/2020 | Lefkofsky et al. |
| 2020/0327412 | A1 | 10/2020 | McCourt et al. |
| 2020/0380378 | A1 | 12/2020 | Moharrer et al. |
| 2020/0411168 | A1 | 12/2020 | Thomas et al. |
| 2021/0326717 | A1 * | 10/2021 | Mueller ............ G06N 20/00 |

FOREIGN PATENT DOCUMENTS

| | | | |
|---|---|---|---|
| GB | 2556978 A | 6/2018 | |
| WO | WO-2018162048 A1 * | 9/2018 | ............. G06F 11/22 |

OTHER PUBLICATIONS (Apr. 7, 2019). Conditional entropy. Wikipedia. Retrieved Feb. 17, 2022, from https://web.archive.org/web/20190428121511/https://en.wikipedia.org/wiki/Conditional_entropy (Year: 2019).*

Gijsbers, Pieter, Joaquin Vanschoren, and Randal S. Olson. "Layered TPOT: Speeding up tree-based pipeline optimization." arXiv preprint arXiv: 1801.06007 (Year: 2018).*

Casimiro, Maria, et al. "Lynceus: Tuning and provisioning data analytic jobs on a budget." Co RR (Year: 2019).*

Groce, et al. "You are the only possible oracle: Effective test selection for end users of interactive machine learning systems." IEEE Transactions on Software Engineering 40.3 (Year: 2013).*

Chakkrit, et al. "The impact of automated parameter optimization on defect prediction models." IEEE Transactions on Software Engineering 45. 7 (Year: 2018).*

Brill et al. "Comprehension and Evolution of Combinatorial Test Designs," 2018 smlab.cs.tau.ac.il/ctd/, Proc of FSE 2018.

Tzoref-Brill et al., "Modify, Enhance, Select: Co-Evolution of Combinatorial Models and Test Plans," *Proceedings of the 26th ACM Joint European Software Engineering Conference and Symposium on the Foundations of Software Engineering (ESEC/FSE '18)* Nov. 2018, 11 pages.

Hughes et al., "The New solveBlackbox Action in SAS Optimization 8.5," SAS Global Forum 2020, Paper SAS 4494-2020.

Louppe et al., Bayesian optimization with skopt—scikit-optimize .0.8.1 documentation, Jul. 2016.

Tzoref-Brill et al., "Syntactic and Semantic Differencing for Combinatorial Models of Test Designs," 2017 IEEE/ACM 39th International Conference on Software Engineering.

Tzoref-Brill et al., "Lattice-Based Semantics for Combinatorial Model Evolution," Springer International Publishing Switzerland 2015, ATVA 2015, LNCS 9364, pp. 276-292, 2015.

Tzoref-Brill et al., "Visualization of Combinatorial Models and Test Plans," *ASE'16* Sep. 3-7, 2016 Singapore, Singapore.

SAS Visual Data Mining and Machine Learning Procedures, Jan. 3, 2021, SAS Documentation Jul. 21, 2021, Copyright SAS Institute, Jul. 2021.

Odena et al., "TensorFuzz: Debugging Neural Networks with Coverage-Guided Fuzzing," *Proceedings of the 36th International Conference on Machine Learning*, Long, Beach, CA, PMLR 97, 2019.

Skopt.gp_minimize—scikit-optimize 0.8.1. documentation, https://scikit-optimize.github.io/stable/modles/generated/skopt.gp_minimize.html, 2017-2020, scikit-optimize contributors.

Jones, D.R., Schonlau, M. & Welch, W.J. Efficient Global Optimization of Expensive Black-Box Functions. Journal of Global Optimization 13, 455-492 (1998).

Nasser, Abdullah B., et al. "Latin Hypercube Sampling Jaya Algorithm based Strategy for T-way Test Suite Generation." *Proceedings of the 2020 9th International Conference on Software and Computer Applications.* 2020.

Stratis, Panagiotis, and Ajitha Rajan. "Speeding up test execution with increased cache locality." *Software Testing, Verification and Reliability* 28.5 (2018): e1671.

Bahaweres, Rizal Broer, et al. "Analysis of statement branch and loop coverage in software testing with genetic algorithm." *2017 4th International Conference on Electrical Engineering, Computer Science and Informatics (EECSI).* IEEE, 2017.

Khamprapai, Wanida, Cheng-Fa Tsai, and Paohsi Wang. "Analyzing the Performance of the Multiple-Searching Genetic Algorithm to Generate Test Cases." *Applied Sciences* 10.20 (2020): 7264.

Zhu, Hong, and Ian Bayley. "Exploratory datamorphic testing of classification applications." Proceedings of the IEEE/ACM 1st International Conference on Automation of Software Test. Oct. 7, 2020.

* cited by examiner

AUTOMATED MACHINE LEARNING TEST SYSTEM

CROSS-REFERENCE TO RELATED APPLICATIONS

The present application claims the benefit of and priority under 35 U.S.C. § 119(e) to U.S. Provisional Patent Application No. 63/128,855 filed Dec. 22, 2020, the entire contents of which are hereby incorporated by reference.

BACKGROUND

Machine learning involves self-calibration of predictive models that are built from training data and commonly used to find hidden value in big data. Facilitating effective decision making often requires the transformation of relevant data to high-quality descriptive and predictive models. The transformation presents several challenges however. Different hyperparameters are used based on the type of predictive model. Not only do the input values used for the hyperparameters dictate the performance of the training process, but more importantly they govern the quality of the resulting predictive models.

Testing of various software components, algorithms, simulation, etc., including trained predictive models, is performed to identify any errors and/or any performance degradation issues by executing the software using various values to inputs to the software including different datasets, where applicable. For guidance in defining the test configurations that include various combinations of test parameter values, testers often rely on their past experience using the software. However, it is difficult to define a broad range of test configurations based on previous experience. There is further an inherent expense in testing the software to evaluate many different test configurations in terms of computing resources, computing time, and user time.

SUMMARY

In an example embodiment, a non-transitory computer-readable medium is provided having stored thereon computer-readable instructions that when executed by a computing device, cause the computing device to automatically select new test configurations for testing software. Software under test is executed with a first plurality of test configurations to generate a test result for each test configuration of the first plurality of test configurations. Each test configuration of the first plurality of test configurations includes a value for each test parameter of the plurality of test parameters. Each test parameter of the plurality of test parameters is an input to the software under test. A predictive model is trained using each test configuration of the first plurality of test configurations in association with the test result generated for each test configuration of the first plurality of test configurations based on an objective function value. The trained predictive model is executed with a second plurality of test configurations to predict the test result for each test configuration of the second plurality of test configurations. Each test configuration of the second plurality of test configurations includes the value for each test parameter of the plurality of test parameters. A predefined number of test configurations is selected from the second plurality of test configurations based on the predicted test result for each test configuration of the second plurality of test configurations. The selected predefined number of test configurations define a third plurality of test configurations. The software under test is executed with the defined third plurality of test configurations to generate the test result for each test configuration of the third plurality of test configurations. Each test configuration of the third plurality of test configurations includes the value for each test parameter of the plurality of test parameters. The generated test result is output for each test configuration of the first plurality of test configurations and for each test configuration of the third plurality of test configurations.

In another example embodiment, a computing device is provided. The computing device includes, but is not limited to, a processor and a non-transitory computer-readable medium operably coupled to the processor. The computer-readable medium has instructions stored thereon that, when executed by the processor, cause the computing device to automatically select new test configurations for testing software.

In yet another example embodiment, a method of automatically selecting new test configurations for testing software is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
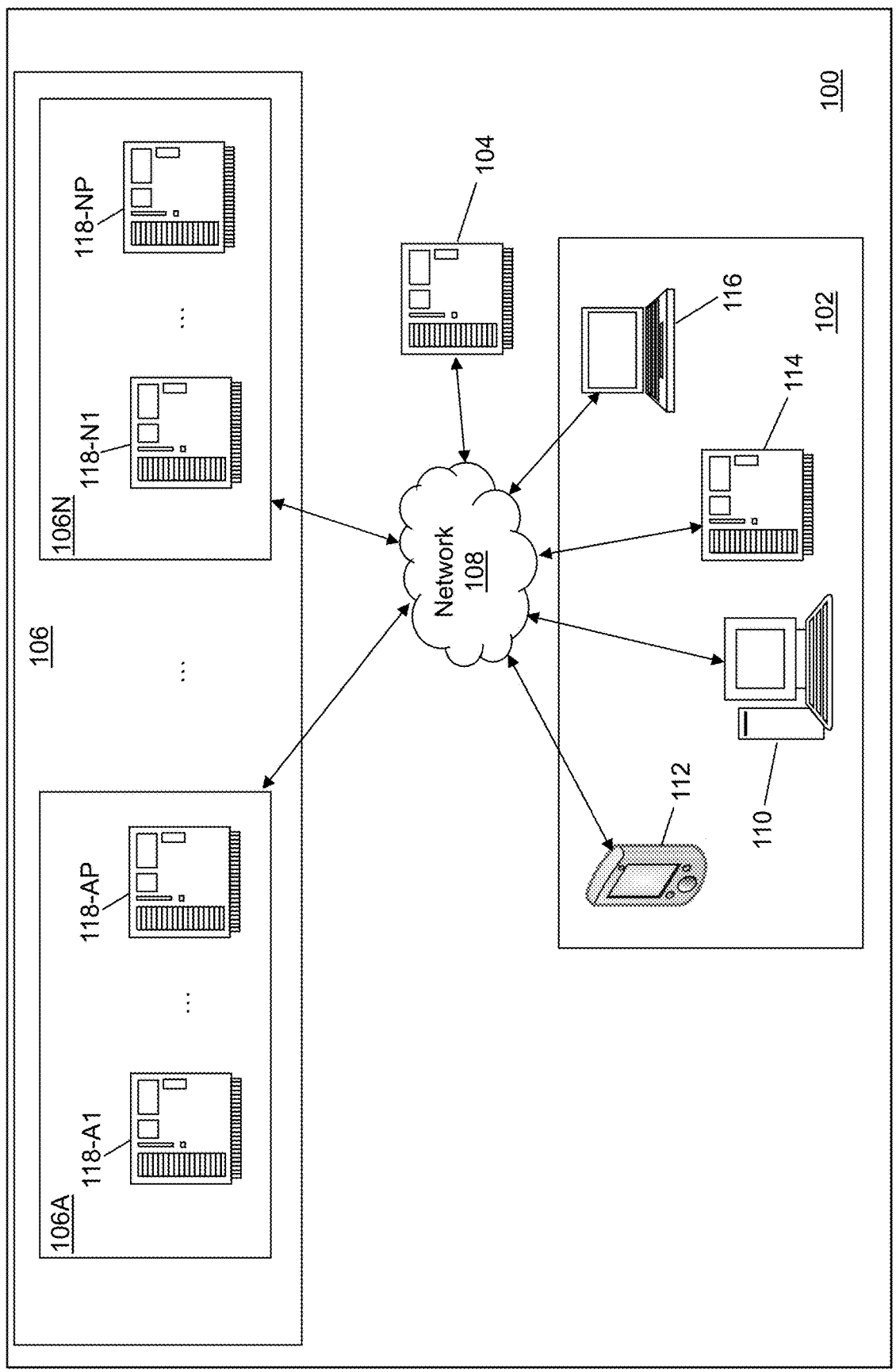
FIG. 1 depicts a block diagram of a test system in accordance with an illustrative embodiment.

Referring to FIG. 1, a block diagram of a test system 100 is shown in accordance with an illustrative embodiment.

Test system 100 provides an automated test system that achieves one or more test objectives efficiently and effectively. Test system 100 draws test samples randomly from given distributions, executes tests in parallel to collect test evaluation historic data, and builds models with the test evaluation historic data to optimize the test generation process and drive tests to better achieve test objectives faster.

Test system 100 can be used as a smart engine for regression tests. Instead of generating test configurations randomly or asking testers to enter several test configurations as initial test configurations, all of the test configurations can be saved in a table as test candidates. Test system 100 randomly selects a small number of test configurations as initial test configurations, executes the test configurations in parallel to collect test evaluation historic data, and builds models with the test evaluation historic data to optimize the regression test execution sequences and drive creation of test configurations to trigger test failures faster.

In an illustrative embodiment, test system 100 may include a user system 102, a test manager device 104, a worker system 106, and a network 108. Each of user system 102, test manager device 104, and worker system 106 may be composed of one or more discrete computing devices in communication through network 108. Alternatively, user system 102, test manager device 104, and worker system 106 may be integrated into a single computing device capable of computing using a plurality of threads.

Network 108 may include one or more networks of the same or different types. Network 108 can be any type of wired and/or wireless public or private network including a cellular network, a local area network, a wide area network such as the Internet or the World Wide Web, etc. Network 108 further may comprise sub-networks and consist of any number of communication devices.

The one or more computing devices of user system 102 may include computing devices of any form factor such as a desktop 110, a smart phone 112, a server computer 114, a laptop 116, a personal digital assistant, an integrated messaging device, a tablet computer, etc. User system 102 can include any number and any combination of form factors of computing devices that may be organized into subnets. In general, a "server" computer may include faster processors, additional processors, more disk memory, and/or more random access memory (RAM) than another computer form factor and support multi-threading as understood by a person of skill in the art. The computing devices of user system 102 may send and receive signals through network 108 to/from another of the one or more computing devices of user system 102 and/or to/from test manager device 104. The one or more computing devices of user system 102 may communicate using various transmission media that may be wired and/or wireless as understood by those skilled in the art. The one or more computing devices of user system 102 may be geographically dispersed from each other and/or co-located.

Figure 2:
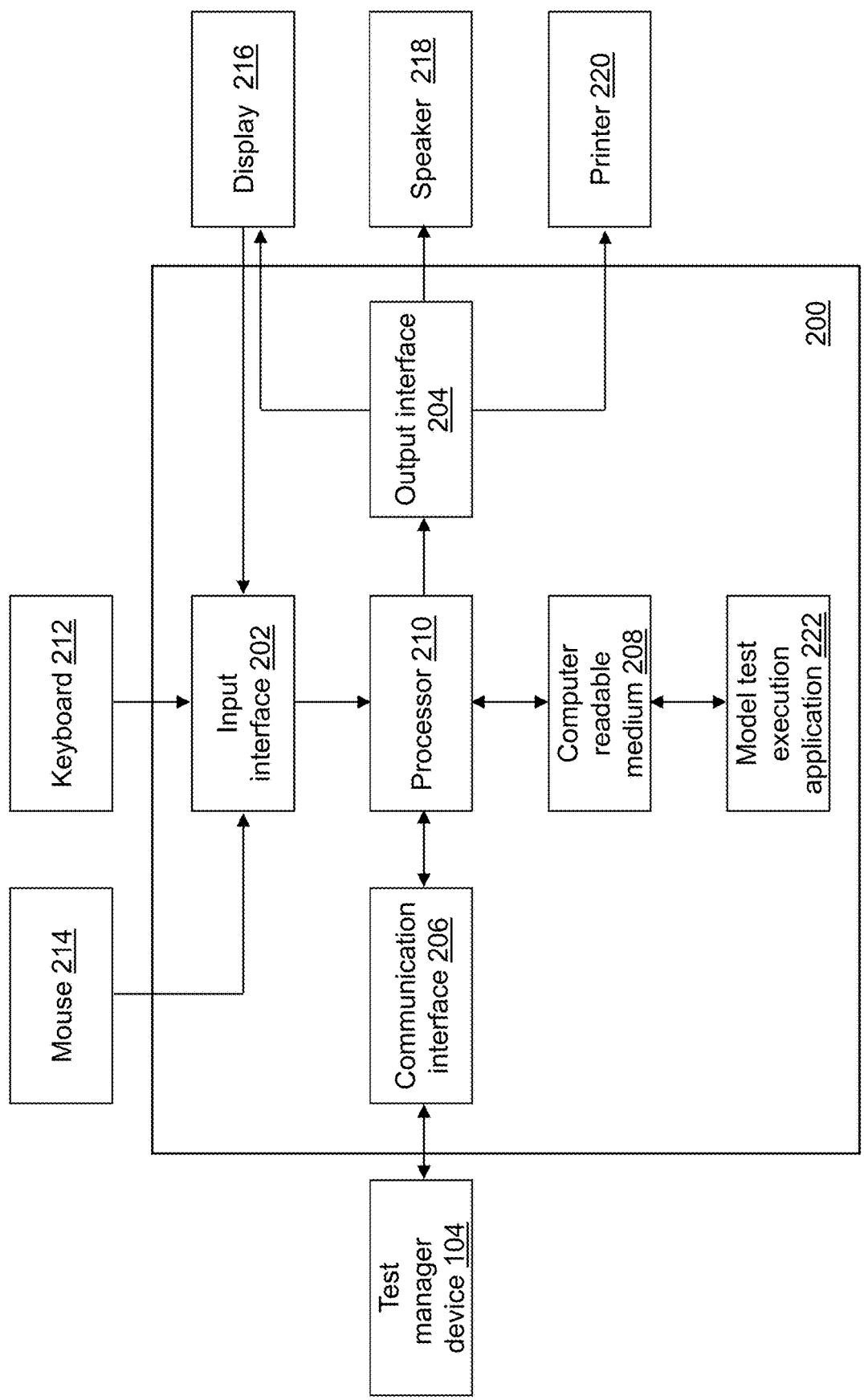
FIG. 2 depicts a block diagram of a user device of the test system of FIG. 1 in accordance with an illustrative embodiment.

For illustration, referring to FIG. 2, a block diagram of a user device 200 is shown in accordance with an example embodiment. User device 200 is an example computing device of user system 102. For example, each of desktop 110, smart phone 112, server computer 114, and laptop 116 may be an instance of user device 200. User device 200 may include an input interface 202, an output interface 204, a communication interface 206, a non-transitory computer-readable medium 208, a processor 210, and a model test execution application 222. Each computing device of user system 102 may be executing model test execution application 222 of the same or different type.

Referring again to FIG. 1, test manager device 104 can include any form factor of computing device. For illustration, FIG. 1 represents test manager device 104 as a server computer. Test manager device 104 may send and receive signals through network 108 to/from user system 102 and/or to/from worker system 106. Test manager device 104 may communicate using various transmission media that may be wired and/or wireless as understood by those skilled in the art. Test manager device 104 may be implemented on a plurality of computing devices of the same or different type. Test system 100 further may include a plurality of test manager devices. User device 200 and test manager device 104 may be implemented in the same computing device using one or more threads.

Figure 3:
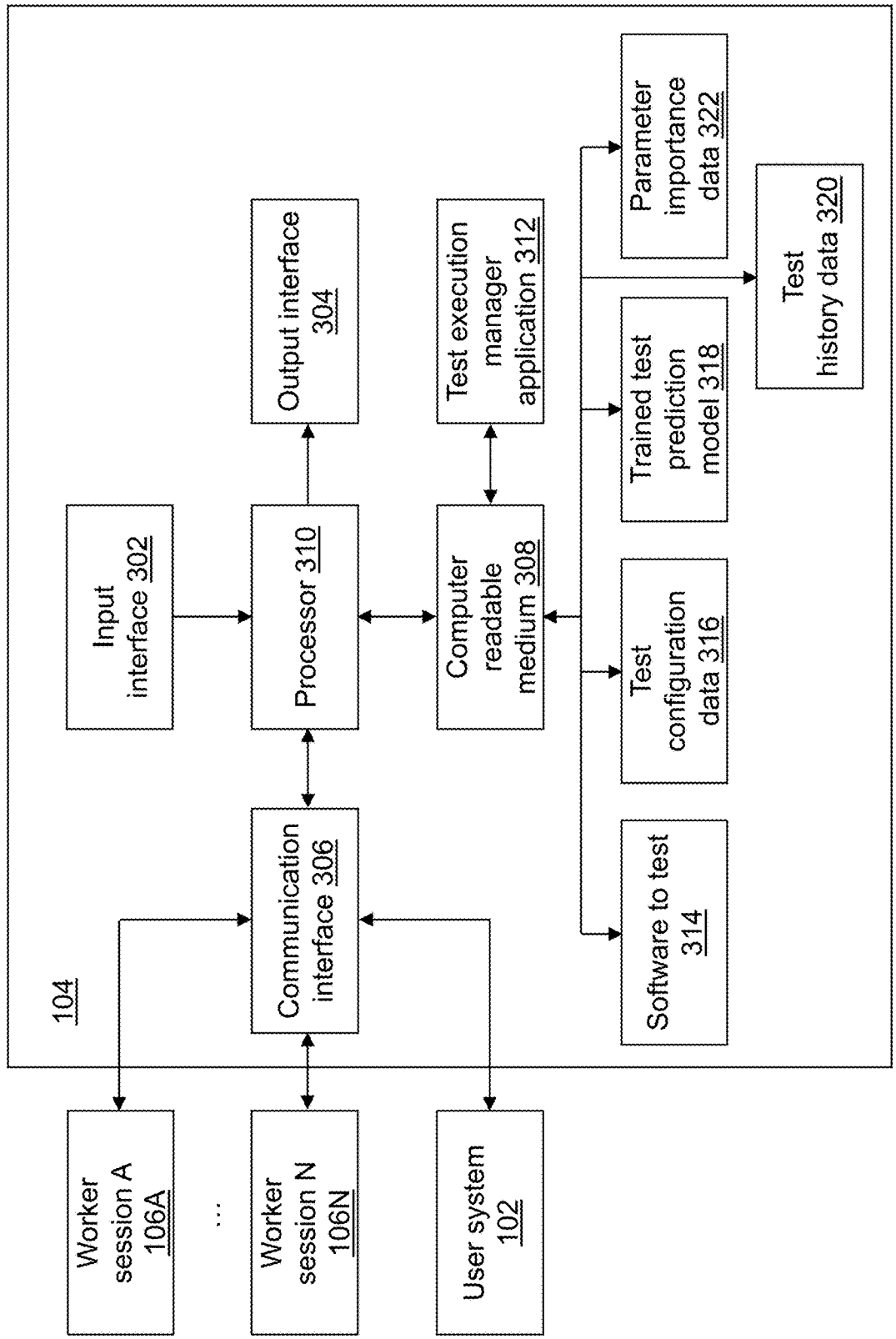
FIG. 3 depicts a block diagram of a test manager device of the test system of FIG. 1 in accordance with an illustrative embodiment.

For illustration, referring to FIG. 3, a block diagram of test manager device 104 is shown in accordance with an illustrative embodiment. Test manager device 104 may include a second input interface 302, a second output interface 304, a second communication interface 306, a second computer-readable medium 308, a second processor 310, a test execution manager application 312, a software to test 314, test configuration data 316, trained test prediction model 318, test history data 320, and parameter importance data 322. Test manager device 104 may execute test execution manager application 312 that defines test configuration data 316, controls execution of the software being tested that is stored in software to test 314, stores the execution results in test history data 320, and trains a test prediction model stored in trained test prediction model 318 using the execution results stored in test history data 320. Worker system 106 executes the software being tested and returns the execution results to test manager device 104.

Referring again to FIG. 1, the one or more computing devices of worker system 106 may include computers of any form factor that may be organized into one or more sessions, where a number of the one or more sessions is indicated by N. Worker system 106 may include a number of computing devices indicated by W. Worker system 106 may include computers of other form factors such as a desktop or a laptop, etc. Worker system 106 can include any number and any combination of form factors of computing devices organized into any number of sessions. For example, in the illustrative embodiment, worker system 106 includes a first worker session 106A, . . . , and an Nth worker session 106N. Each session may include one or more computing devices, where a number of session computing devices in each session is indicated by P. In the illustrative embodiment, first worker session 106A may include a first computing device 118-A1, . . . , and a Pth computing device 118-AP, and Nth worker session 106N may include a first computing device 118-N1, . . . , and a Pth computing device 118-NP. The number of computing devices indicated by W may or may not also include test manager device 104. A number of threads may be associated with each computing device of worker system 106.

The computing devices of worker system 106 may send and receive signals through network 108 to/from test manager device 104 and/or to/from user system 102 and/or to/from another computing device of worker system 106. The one or more computing devices of worker system 106 may be geographically dispersed from each other and/or co-located. The one or more computing devices of worker system 106 may communicate using various transmission media that may be wired and/or wireless as understood by those skilled in the art.

Figure 4A:
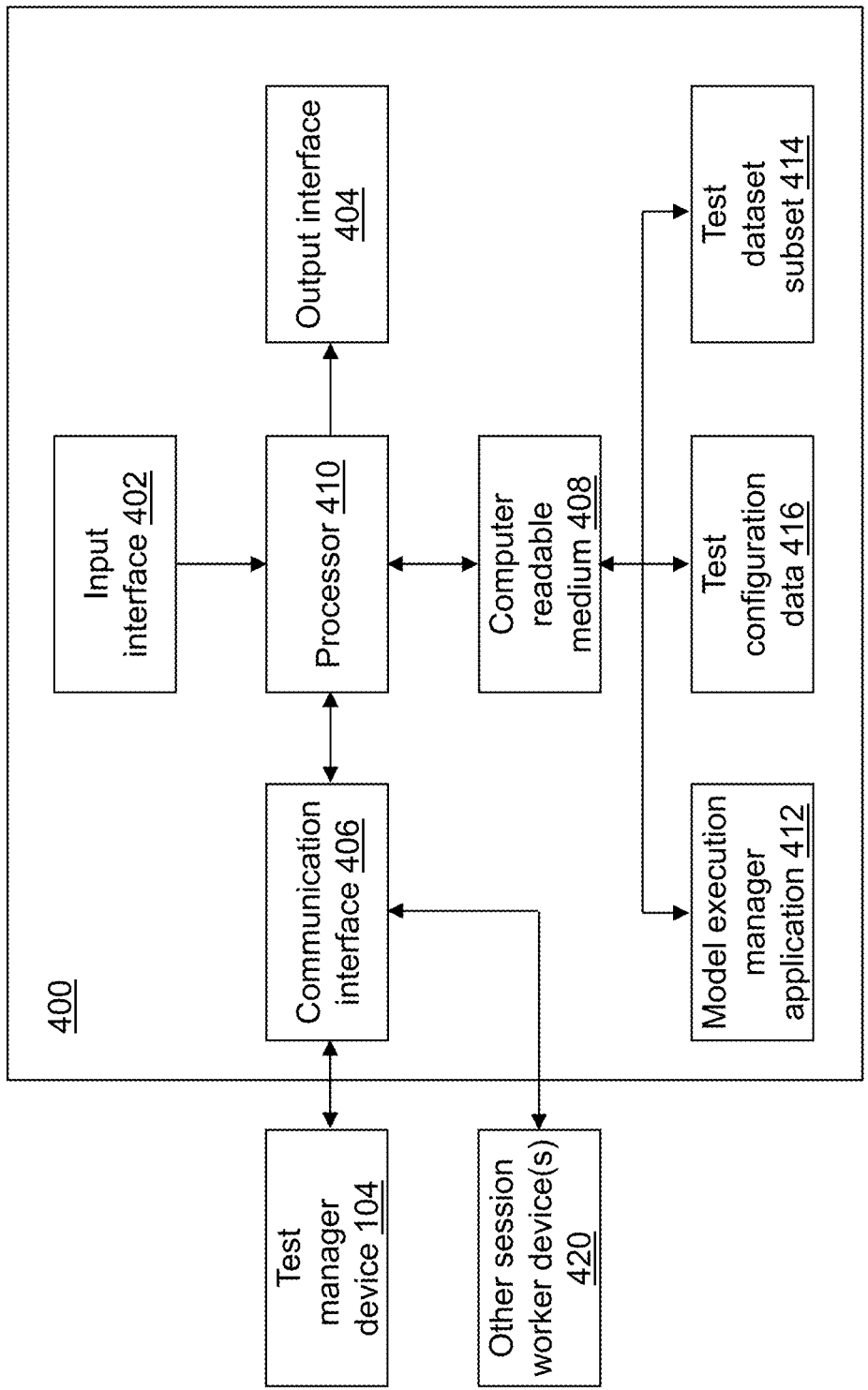
FIG. 4A depicts a block diagram of a session manager device of the test system of FIG. 1 in accordance with an illustrative embodiment.

For illustration, referring to FIG. 4A, a block diagram of a session manager device 400 is shown in accordance with an example embodiment. Session manager device 400 is an example computing device of each session of worker system 106. For example, a first computing device of each session, such as first computing device 118-A1 of first worker session 106A and first computing device 118-N1 of Nth worker session 106N, may be an instance of session manager device 400. Session manager device 400 may include a third input interface 402, a third output interface 404, a third communication interface 406, a third computer-readable medium 408, a third processor 410, a model execution manager application 412, a first test dataset subset 414, and test configuration data 416.

Figure 4B:
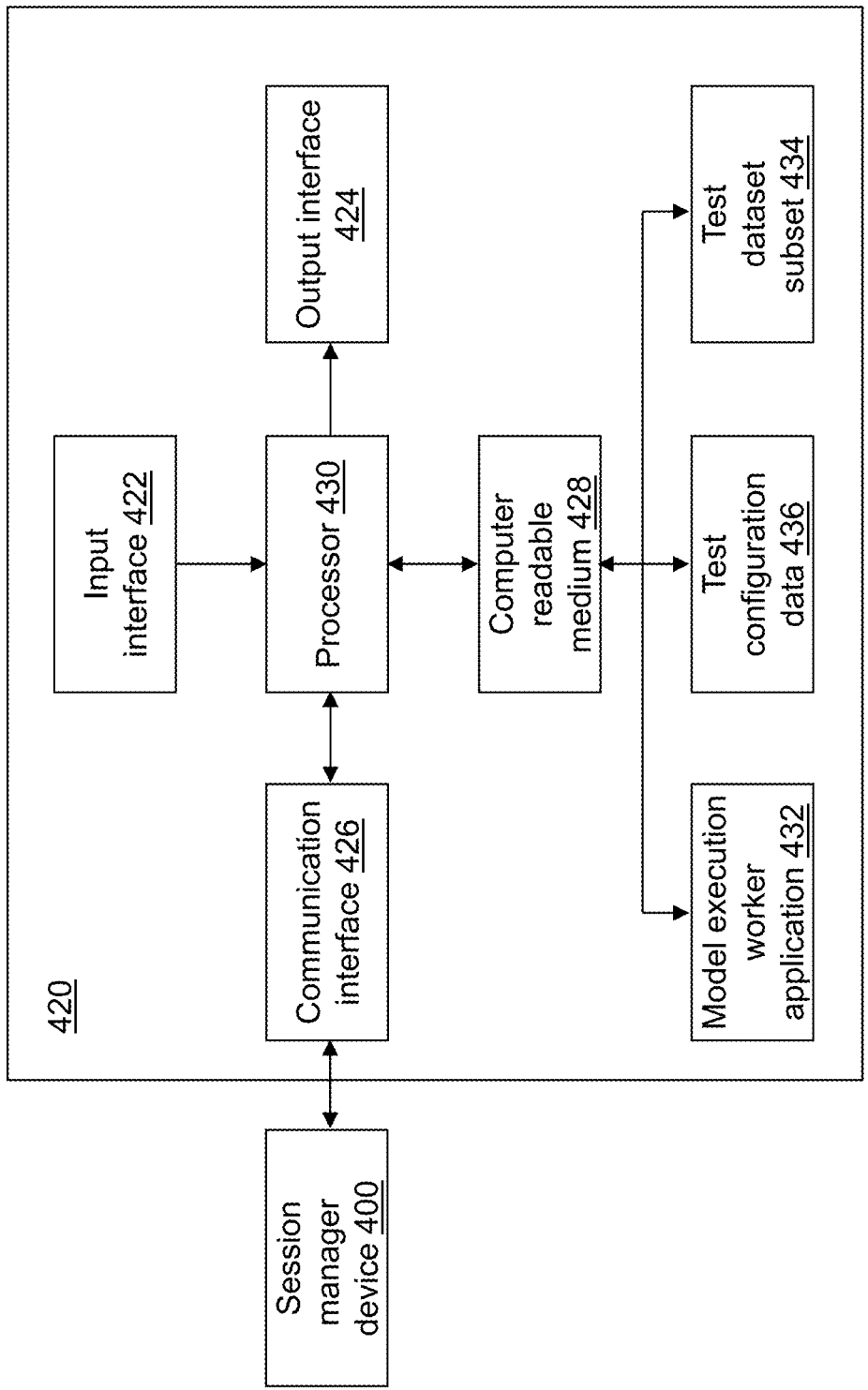
FIG. 4B depicts a block diagram of a session worker device of the test system of FIG. 1 in accordance with an illustrative embodiment.

For illustration, referring to FIG. 4B, a block diagram of a session worker device 420 is shown in accordance with an example embodiment. Session worker device 420 is an example worker computing device of each session of worker system 106. For example, remaining computing devices of each session, such as . . . , and Pth computing device 118-AP of first worker session 106A and . . . , and Pth computing device 118-NP of nth worker session 106N, may each be an instance of session worker device 420. Session worker device 420 may include a fourth input interface 422, a fourth output interface 424, a fourth communication interface 426, a fourth computer-readable medium 428, a fourth processor 430, a model execution worker application 432, a test dataset subset 434, and test configuration data 436.

Because the test dataset may need to be distributed across a plurality of computing devices due to its size, each session may include a plurality of computing devices with one of the computing devices acting as the session manager and referred to as session manager device 400. The test dataset may be distributed into data subsets at each computing device included in the respective session, with each session distributing the test dataset in a similar manner among its computing devices. For example, if first worker session 106A includes three computing devices, approximately a third of the test dataset is distributed to each computing device of first worker session 106A that may or may not include a first session manager device 400A of first worker session 106A depending on whether first session manager device 400A includes itself as a session worker computing device. Nth worker session 106N similarly distributes the test dataset among the computing devices of Nth worker session 106N. First test dataset subset 414 may be created at session manager device 400 or at a first worker computing device of each worker session depending on whether session manager device 400 is using itself as a worker device. Thus, session manager device 400 may coordinate the distribution with or without storing a portion of the test dataset in test dataset subset 414. Test manager device 104 and session manager device 400 may be implemented in the same computing device using one or more threads.

Referring again to FIG. 2, each user device 200 of user system 102 may include the same or different components and combinations of components. Fewer, different, and additional components may be incorporated into user device 200.

Input interface 202 provides an interface for receiving information for entry into user device 200 as understood by those skilled in the art. Input interface 202 may interface with various input technologies including, but not limited to, a keyboard 212, a mouse 214, a display 216, a track ball, a keypad, one or more buttons, etc. to allow the user to enter information into user device 200 or to make selections presented in a user interface displayed on display 216. The same interface may support both input interface 202 and output interface 204. For example, display 216 that includes a touch screen allows user input and presents output to the user. User device 200 may have one or more input interfaces that use the same or a different input interface technology. The input interface technology further may be accessible by user device 200 through communication interface 206.

Output interface 204 provides an interface for outputting information from user device 200, for example, to a user of user device 200 or to another device. For example, output interface 204 may interface with various output technologies including, but not limited to, display 216, a speaker 218, a printer 220, etc. User device 200 may have one or more output interfaces that use the same or a different interface technology. The output interface technology further may be accessible by user device 200 through communication interface 206.

Communication interface 206 provides an interface for receiving and transmitting data between devices using various protocols, transmission technologies, and media as understood by those skilled in the art. Communication interface 206 may support communication using various transmission media that may be wired and/or wireless. User device 200 may have one or more communication interfaces that use the same or a different communication interface technology. For example, user device 200 may support communication using an Ethernet port, a Bluetooth antenna, a telephone jack, a USB port, etc. Data and messages may be transferred between user device 200 and test manager device 104 using communication interface 206.

Computer-readable medium 208 is a non-transitory electronic holding place or storage for information so the information can be accessed by processor 210 as understood by those skilled in the art. Computer-readable medium 208 can include, but is not limited to, any type of RAM, any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. User device 200 may have one or more computer-readable media that use the same or a different memory media technology. For example, computer-readable medium 208 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. User device 200 also may have one or more drives that support the loading of a memory media such as a CD or DVD, an external hard drive, etc. One or more external hard drives further may be connected to user device 200 using communication interface 106.

Processor 210 executes instructions as understood by those skilled in the art. The instructions may be carried out by a special purpose computer, logic circuits, or hardware circuits. Processor 210 may be implemented in hardware and/or firmware. Processor 210 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 210 operably couples with input interface 202, with output interface 204, with communication interface 206, and with computer-readable medium 208 to receive, to send, and to process information. Processor 210 may retrieve a set of instructions from a permanent memory device and copy the instructions in an executable form to a temporary memory device that is generally some form of RAM. User device 200 may include a plurality of processors that use the same or a different processing technology.

Model test execution application 222 performs operations associated with initiating a testing process on software to test 314. The operations may be implemented using hardware, firmware, software, or any combination of these methods. Referring to the example embodiment of FIG. 2, model test execution application 222 is implemented in software (comprised of computer-readable and/or computer-executable instructions) stored in computer-readable medium 208 and accessible by processor 210 for execution of the instructions that embody the operations of model test execution application 222. Model test execution application 222 may be written using one or more programming languages, assembly languages, scripting languages, etc.

Model test execution application 222 may be implemented as a Web application. For example, model test execution application 222 may be configured to receive hypertext transport protocol (HTTP) responses and to send HTTP requests. The HTTP responses may include web pages such as hypertext markup language documents and linked objects generated in response to the HTTP requests. Each web page may be identified by a uniform resource locator that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an XML file, or any other type of file supported by HTTP.

Model test execution application 222 may be integrated with other analytic tools. As an example, model test execution application 222 may be part of an integrated data analytics software application and/or software architecture such as that offered by SAS Institute Inc. of Cary, North Carolina, USA. For example, model test execution application 222 may be part of SAS® Enterprise Miner™ and/or SAS® Viya™ developed and provided by SAS Institute Inc. of Cary, North Carolina, USA that may be used to test CAS actions, SAS procedures, macros or user-defined CAS actions developed by SAS users based on running many tests driven by advanced algorithms to improve test coverage and speed up testing. Merely for further illustration, model test execution application 222 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS In-Memory Statistics for Hadoop®, and SAS® Forecast Server, all of which are developed and provided by SAS Institute Inc. of Cary, North Carolina, USA. Data mining is applicable in a wide variety of industries.

Referring again to FIG. 3, fewer, different, or additional components may be incorporated into test manager device 104. Second input interface 302 provides the same or similar functionality as that described with reference to input interface 202 of user device 200 though referring to test manager device 104. Second output interface 304 provides the same or similar functionality as that described with reference to output interface 204 of user device 200 though referring to test manager device 104. Second communication interface 306 provides the same or similar functionality as that described with reference to communication interface 206 of user device 200 though referring to test manager device 104. Data and messages may be transferred between test manager device 104 and/or user device 200 and session manager device 400 using second communication interface 306. Second computer-readable medium 308 provides the same or similar functionality as that described with reference to computer-readable medium 208 of user device 200 though referring to test manager device 104. Second processor 310 provides the same or similar functionality as that described with reference to processor 210 of user device 200 though referring to test manager device 104.

Test execution manager application 312 performs operations associated with defining one or more sets of test configurations to execute as inputs to software to test 314 based on inputs provided from user device 200. Test execution manager application 312 requests that the computing devices of worker system 106 execute a test of software to test 314 for each test configuration in the defined one or more sets of test configurations. The operations may be implemented using hardware, firmware, software, or any combination of these methods. Referring to the example embodiment of FIG. 3, test execution manager application 312 is implemented in software (comprised of computer-readable and/or computer-executable instructions) stored in second computer-readable medium 308 and accessible by second processor 310 for execution of the instructions that embody the operations of test execution manager application 312. Test execution manager application 312 may be written using one or more programming languages, assembly languages, scripting languages, etc. Test execution manager application 312 may be implemented as a Web application. Similar to model test execution application 222, test execution manager application 312 may be integrated with other analytic tools.

Referring again to FIG. 4A, fewer, different, and additional components may be incorporated into session manager device 400. Each session manager device 400 of each session of worker system 106 may include the same or different components or combination of components.

Third input interface 402 provides the same or similar functionality as that described with reference to input interface 202 of user device 200 though referring to session manager device 400. Third output interface 404 provides the same or similar functionality as that described with reference to output interface 204 of user device 200 though referring to session manager device 400. Third communication interface 406 provides the same or similar functionality as that described with reference to communication interface 206 of user device 200 though referring to session manager device 400. Data and messages may be transferred between session manager device 400 and another computing device of worker system 106 and/or test manager device 104 using third communication interface 406. Third computer-readable medium 408 provides the same or similar functionality as that described with reference to computer-readable medium 208 of user device 200 though referring to session manager device 400. Third processor 410 provides the same or similar functionality as that described with reference to processor 210 of user device 200 though referring to session manager device 400.

Model execution manager application 412 performs operations associated with coordinating execution of software to test 314 by an associated session based on inputs provided from test manager device 104. The operations may be implemented using hardware, firmware, software, or any combination of these methods. Referring to the example embodiment of FIG. 4A, model execution manager application 412 is implemented in software (comprised of computer-readable and/or computer-executable instructions) stored in third computer-readable medium 408 and accessible by third processor 410 for execution of the instructions that embody the operations of model execution manager application 412. Model execution manager application 412 may be written using one or more programming languages, assembly languages, scripting languages, etc. Model execution manager application 412 may be implemented as a Web application. Similar to model test execution application 222, model execution manager application 412 may be integrated with other analytic tools.

Referring again to FIG. 4B, fewer, different, and additional components may be incorporated into session worker device 420. Each session worker device 420 of each session of worker system 106 may include the same or different components or combination of components.

Fourth input interface 422 provides the same or similar functionality as that described with reference to input interface 202 of user device 200 though referring to session worker device 420. Fourth output interface 424 provides the same or similar functionality as that described with reference to output interface 204 of user device 200 though referring to session worker device 420. Fourth communication interface 426 provides the same or similar functionality as that described with reference to communication interface 206 of user device 200 though referring to session worker device 420. Data and messages may be transferred between session worker device 420 and another computing device of the associated session of worker system 106 and/or session manager device 400 using fourth communication interface 426. Fourth computer-readable medium 428 provides the same or similar functionality as that described with reference to computer-readable medium 208 of user device 200 though referring to session worker device 420. Fourth processor 430 provides the same or similar functionality as that described with reference to processor 210 of user device 200 though referring to session worker device 420.

Model execution worker application 432 performs operations associated with executing software to test 314 using test dataset subset 434 and test configuration data 436 provided by session manager device 400. When session manager device 400 is also a session worker computing device, session manager device 400 also performs the operations of model execution worker application 432. The operations may be implemented using hardware, firmware, software, or any combination of these methods. Referring to the example embodiment of FIG. 4B, model execution worker application 432 is implemented in software (comprised of computer-readable and/or computer-executable instructions) stored in fourth computer-readable medium 428 and accessible by fourth processor 430 for execution of the instructions that embody the operations of model execution worker application 432. Model execution worker application 432 may be written using one or more programming languages, assembly languages, scripting languages, etc. Model execution worker application 432 may be implemented as a Web application. Similar to model test execution application 222, model execution worker application 432 may be integrated with other analytic tools.

Model test execution application 222, test execution manager application 312, model execution manager application 412, and/or model execution worker application 432 may be the same or different applications that are integrated in various manners to define one or more sets of test configurations, select each test configuration, and execute software to test 314 using test dataset subset 434 and test configuration data 436 on a single computing device or on a plurality of computing devices.

The test dataset may include, for example, a plurality of rows and a plurality of columns. The plurality of rows may be referred to as observation vectors or records (observations), and the columns may be referred to as variables. The test dataset may be transposed. The plurality of variables may define multiple dimensions for each observation vector. An observation vector $x_i$ may include a value for each of the plurality of variables associated with the observation i.

The test dataset may be stored on computer-readable medium 208, on second computer-readable medium 308, on third computer-readable medium 408, and/or on fourth computer-readable medium 428, and/or on one or more computer-readable media accessible by model execution manager application 412 using third communication interface 406 and/or third input interface 402 or accessible by model execution worker application 432 using fourth communication interface 426 and/or fourth input interface 422.

Data stored in the test dataset may be sensor measurements or signal values captured by a sensor such as a camera, may be generated or captured in response to occurrence of an event or a transaction, generated by a device such as in response to an interaction by a user with the device, etc. The data stored in the test dataset may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in the test dataset may be captured at different time points periodically, intermittently, when an event occurs, etc. One or more columns of the test dataset may include a time and/or date value.

The test dataset may include data captured under normal operating conditions of the physical object. The test dataset may include data captured at a high data rate such as 200 or more observations per second for one or more physical objects. For example, data stored in the test dataset may be generated as part of the Internet of Things (IoT), where things (e.g., machines, devices, phones, sensors) can be connected to networks and the data from these things collected and processed within the things and/or external to the things before being stored in the test dataset. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in the test dataset.

The test dataset may be stored using various structures as known to those skilled in the art including one or more files of a file system, a relational database, one or more tables of a system of tables, a structured query language database, etc. Each session manager device 400 may coordinate access to the test dataset that is distributed across the session worker devices of the associated session that may include zero or more session worker devices. For example, the test dataset may be stored in a cube distributed across the computing devices of each session that is a grid of computers as understood by a person of skill in the art. As another example, the test dataset may be stored across the computing devices of each session that form a multi-node Hadoop® cluster. For instance, Apache™ Hadoop® is an open-source software framework for distributed computing supported by the Apache Software Foundation. As another example, the test dataset may be stored across the computing devices of each session that form a cloud of computers and may be accessed using cloud computing technologies, as understood by a person of skill in the art. The SAS® LASR™ Analytic Server may be used as an analytic platform to enable multiple users to concurrently access data stored in the test dataset. The SAS® Viya™ open, cloud-ready, in-memory architecture also may be used as an analytic platform to enable multiple users to concurrently access data stored in the test dataset. SAS Cloud Analytic Services (CAS) may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 5:
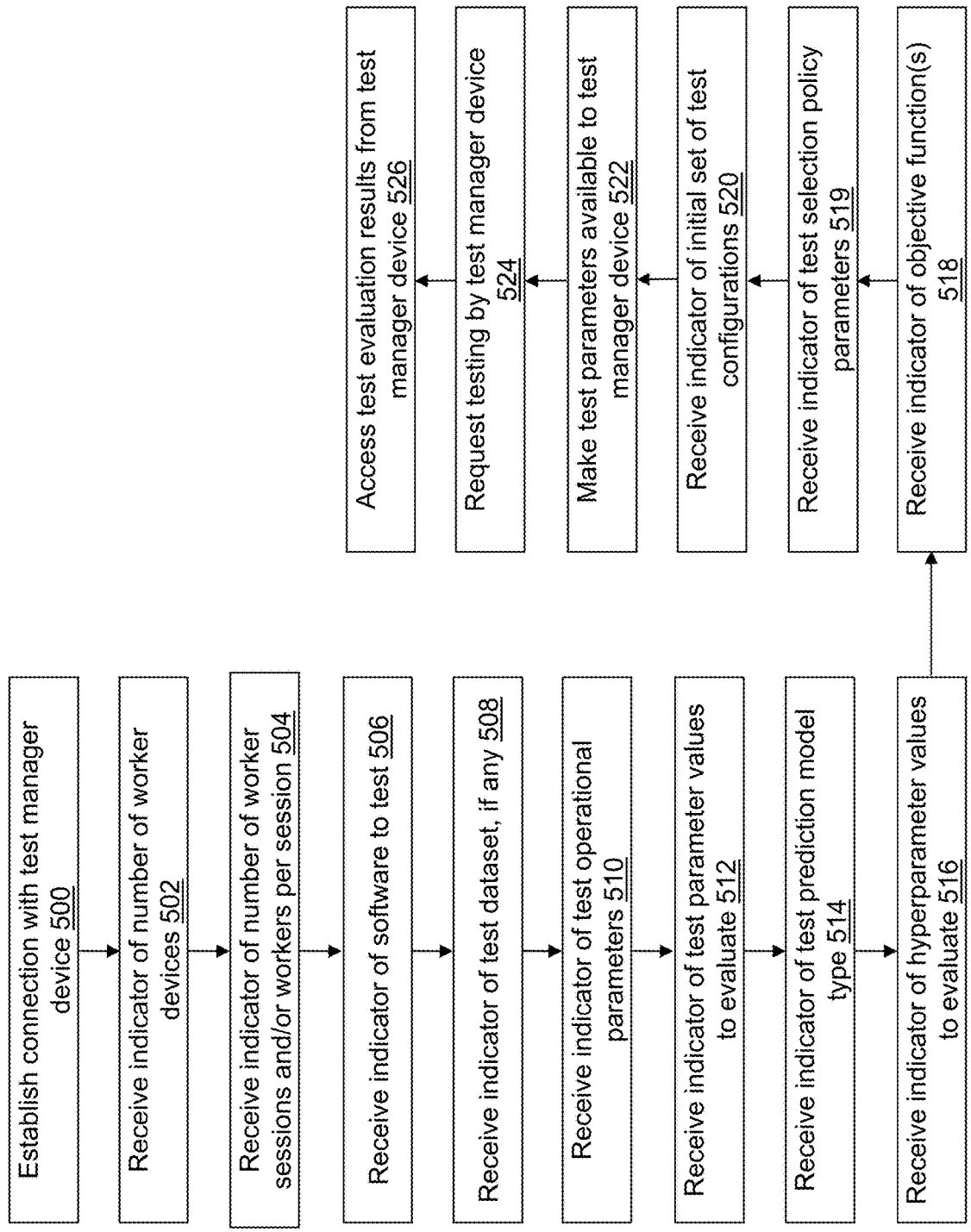
FIG. 5 depicts a flow diagram illustrating examples of operations performed by the user device of FIG. 2 in accordance with an illustrative embodiment.

Referring to FIG. 5, example operations associated with model test execution application 222 are described. Additional, fewer, or different operations may be performed depending on the embodiment. The order of presentation of the operations of FIG. 5 is not intended to be limiting. A user can interact with one or more user interface windows presented to the user in a display under control of model test execution application 222 independently or through a browser application in an order selectable by the user. Although some of the operational flows are presented in sequence, the various operations may be performed in various repetitions, concurrently, and/or in other orders than those that are illustrated. For example, a user may execute model test execution application 222, which causes presentation of a first user interface window, which may include a plurality of menus and selectors such as drop down menus, buttons, text boxes, hyperlinks, etc. associated with model test execution application 222 as understood by a person of skill in the art. As further understood by a person of skill in the art, various operations may be performed in parallel, for example, using a plurality of threads or a plurality of computing devices such as a grid or a cloud of computing devices.

In an operation 500, a connection is established with test manager device 104. User device 200 accepts instructions from a user and relays the instructions to test manager device 104.

In an operation 502, a first indicator may be received that indicates a value of W the number of computing devices or nodes of worker system 106 that may include test manager device 104 (for example, the same or another indicator may indicate whether or not to include test manager device 104 or it may or may not be included by default). The first indicator may further indicate whether test manager device 104 is configured in a single-machine mode or a distributed mode. In an alternative embodiment, the first indicator may not be received. For example, a default value may be stored, for example, in computer-readable medium 208 and used automatically. In another alternative embodiment, W may not be selectable. Instead, a fixed, predefined value may be used. The value further may be automatically determined based on a number of computing devices connected to test manager device 104.

Single-machine mode is a computing model in which multiple processors or multiple cores are controlled by a single operating system and can access shared resources, such as disks and memory. Single-machine mode refers to an application running multiple concurrent threads on a multi-core machine to take advantage of parallel execution on test manager device 104. More simply, single-machine mode means multithreading on test manager device 104. Single-machine mode uses the number of CPUs (cores) on test manager device 104 to determine the number of concurrent threads. For example, one thread per core may be used though a number of threads on any computing device may be changed under control of the user. A grid host may be specified for a distributed mode and identify a domain name system or IP address of test manager device 104, when test manager device 104 is a separate device from user device 200.

In an operation 502, a second indicator may be received that indicates the value of N the number of the one or more sessions and/or the value of P the number of computing devices included in each session. Within each session, when a test process is executed, each computing device of that session may use multiple threads. In an alternative embodiment, the second indicator may not be received. For example, default values may be stored, for example, in computer-readable medium 208 and used automatically. In another alternative embodiment, P or N may not be selectable. Instead, a fixed, predefined value may be used. The value(s) further may be automatically determined based on W and other criteria such that the user does not specify either or one of N the number of the one or more sessions and P the number of computing devices included in each session. W, P, and N may all be equal to one.

In an operation 506, a third indicator may be received that indicates the software to test. For example, the third indicator indicates a location and a name of software to test 314. As an example, the third indicator may be received by model test execution application 222 after selection from a user interface window or after entry by a user into a user interface window. For illustration, software to test 314 may be software that is under test such as a trained machine learning model though other types of software, such as a simulation or other software tool, may be the software that is under test. For example, software to test 314 may be defined using the SAS ASTORE format developed and provided by SAS Institute Inc. of Cary, North Carolina, USA for faster in-memory scoring. As another example, the model to test may be provided in the form of a test program with static and dynamic code parts, where the dynamic code is defined using a test configuration described below. For illustration, the static code may be
    validateTSModel.validateTSDL/
        data='air',
        orderByVar='date',
        var='air',
        maxDateForTrain='01JAN1960'd
The same test dataset "air" is used for each test execution. In an illustrative embodiment, a preCode parameter may be used to define software to test 314. Based on the illustration, the preCode parameter may be defined as
    preCode=
        "validateTSModel.validateTSDL/
        data='air',
        orderByVar='date',
        var='air',
        maxDateForTrain="||quote("'01JAN1960'd")||",";

In an operation 508, a fourth indicator may be received that indicates the test dataset. For example, the fourth indicator indicates a location and a name of the test dataset. As an example, the fourth indicator may be received by model test execution application 222 after selection from a user interface window or after entry by a user into a user interface window. In the illustration above, the test dataset is defined as "air" using the preCode parameter. In an alternative embodiment, the fourth indicator may not be received. For example, the software to test may not employ test data.

In an operation 510, a fifth indicator may be received that provides test operational parameters. For example, the fifth indicator may include a random seed value, a number of initial test configurations, a maximum overall execution time, a maximum test execution time, a number of predicted test set iterations, etc. In an alternative embodiment, the fifth indicator may not be received. For example, a default value(s) may be stored, for example, in computer-readable medium 208 and used automatically. In another alternative embodiment, a fixed, predefined value may be used for each test operational parameter.

In an operation 512, a sixth indicator may be received that provides test parameter values to evaluate. For example, the sixth indicator may include a plurality of test parameters. For each test parameter of the plurality of test parameters, a parameter name, a parameter type, a parameter value range, a parameter sampling method, a parameter flag to indicate whether the parameter is required or optional, a selection probability, any dependency on other test parameters, etc. may be defined using the sixth indicator. Each test parameter is an input to software to test 314. The sixth indicator may further include a number of test configurations to generate in a full set of test configurations.

A test configuration includes a parameter value for each test parameter of the plurality of test parameters that is input to software to test 314 when software to test 314 is executed. The parameter value range defines a minimum value to evaluate and a maximum value to evaluate.

The parameter sampling method defines a distribution sampling method to select different values in the parameter value range. Illustrative sampling methods include Latin hypercube sampling, Sobol sampling, Hammersley sampling, grid sampling, and random sampling as understood by a person of skill in the art. A distribution function may be defined when random sampling is indicated. For example, the distribution function may be uniform, Gaussian, log-uniform, etc. Based on the method selected, additional parameters may be indicated. For example, when random sampling with the Gaussian distribution function is specified, a mean value and a standard deviation value may also be specified.

For illustration, the test parameters and associated values may be defined using a string variable. For example, software to test 314 may be the action "validateTSModel.validateTSDL" above that has four parameters named: 1) "maxLag", 2) "learningRate", 3) "maxEpochs", and 4) "stagnation". Dynamic values are determined for each of the four parameters in each test configuration that is defined as described below. The parameter type may indicate a type of variable such as integer, character, binary, numeric, etc. The parameter value range includes a minimum value and a maximum value to evaluate for the respective test parameter as part of the test process. For example, an inOpts parameter may be defined as

```
inOpts='
    maxLag:int#1~12+
    learningRate:double#(0~1)+
    maxEpochs:int#1~100+
    stagnation:int#0~10+
';
```

The selection probability is used to determine whether the associated test parameter is varied from a default value or a most recent value in each defined test configuration. A default value for the selection probability may be 50%.

In an operation 514, a seventh indicator of a test prediction model type may be received. For example, the seventh indicator indicates a name of a model type. The test prediction model type is trained using previous test results to identify additional test configurations. The seventh indicator may be received by model test execution application 222 after selection from a user interface window or after entry by a user into a user interface window. As an example, a model type may be selected from "Random Forest", "Bayesian Optimizer", "Logistic Regression", Support Vector Machine", "Neural Network", Label Spreading", "Linear Regression", etc. For example, other test prediction model types may include a decision tree model type, a gradient boosting tree model type, etc. Of course, the model type may be labeled or selected in a variety of different manners by the user as understood by a person of skill in the art. In an alternative embodiment, the model type may not be selectable, and a single model type is implemented in model test execution application 222.

The Random Forest model type automatically adjusts forest test parameters to tune a forest model for minimum error as measured by a specified objective function. The forest model type creates a decision tree recursively by choosing an input variable and using it to create a rule to split the data into two or more subsets. The process is repeated in each subset, and again in each new subset, and so on until a constraint is met. For illustration, a FOREST procedure included in SAS® Visual Data Mining and Machine Learning 8.1 may be used to implement the forest model type in SAS® Viya™ developed and provided by SAS Institute Inc. of Cary, North Carolina, USA. The FOREST procedure creates a predictive model called a forest, which consists of several decision trees, in SAS Viya. The FOREST procedure creates multiple decision trees that differ from each other in two ways: 1) the training data for each tree constitutes a different sample, and each sample is created by sampling, with replacement, observations from the original training data of the forest, and 2) the input variables that are considered for splitting a node are randomly selected from all available inputs.

For illustration, an "autotune" statement used with the FOREST procedure included in SAS® Visual Data Mining and Machine Learning 8.1 may be used to evaluate different hyperparameter configurations and to select the best configuration of hyperparameter values for the forest model type as described in U.S. Pat. No. 10,360,517, in U.S. Pat. No. 10,600,005, in U.S. Pat. No. 10,832,174, and in U.S. Pat. No. 11,093,833.

For illustration, the Bayesian Optimizer model type creates and explores a kriging surrogate model to identify additional test configurations. A Kriging model is a type of interpolation algorithm for which the interpolated values are modeled by a Gaussian process governed by prior covariance values. The basic idea of Kriging is to predict the value of a function at a given point by computing a weighted average of the known values of the function in the neighborhood of the point. The method is mathematically closely related to regression analysis. The results from the previous iteration may be used to generate the initial Kriging model or update the previous Kriging model. The Bayesian Optimizer model type may be used to generate new test configurations (evaluation points) by computing an acquisition function that accounts for an uncertainty of a surrogate model.

In an operation 516, an eighth indicator may be received that defines values for one or more variables associated with training the model type selected in operation 516. For example, the random forest model type hyperparameters may include a fraction (bootstrap) of a random bootstrap sample of the training data to be used for growing each tree in the forest, a maximum depth of a decision tree to be grown, a number of trees to grow, a number of input variables to consider splitting on in a node, etc. For example, the Bayesian Optimizer model type hyperparameters may include a population size, an initial test sample size for the Kriging model, a maximum number of points in the Kriging model, a maximum number of iterations may be specified where the population size defines the number of test configurations to evaluate each iteration, etc.

In an operation 518, a ninth indicator of an objective function(s) may be received. For example, the ninth indicator indicates one or more names of objective function(s). The objective function(s) specifies a measure of model error or model accuracy to be used to identify a worst configuration of the test parameters among those evaluated to identify regions where software to test 314 fails or provides degraded performance. Unlike training a model to minimize error and/or maximize model accuracy, the objective function(s) may maximize the error and/or minimize the accuracy achieved using software to test 314. The objective function(s) may further specify a model execution characteristic such as whether the test execution failed and an error code when generated, an execution time, a memory used during the test execution, etc. The ninth indicator may be received by model test execution application 222 after a selection from a user interface window or after entry by a user into a user interface window. A default value for the objective function may further be stored, for example, in computer-readable medium 208. As an example, an objective function may be selected from "ASE", "AUC", "F05", "F1", "GAMMA", "GINI", "KS", "MAE", "MCE", "MCLL", "MISC", "MSE", "MSLE", "RASE", "RMAE", "RMSLE", "TAU", "Pass/Fail", "Execution Time", "Memory", etc.

ASE uses an average squared error as the objective function; AUC uses an area under a curve as the objective function (nominal type only); F05 uses a F0.5 coefficient as the objective function (nominal type only); F1 uses an F1 coefficient as the objective function (nominal type only); GAMMA uses a gamma coefficient as the objective function (nominal type only); GINI uses a Gini coefficient as the objective function (nominal type only); KS uses a Kolmogorov-Smirnov coefficient as the objective function (nominal type only); MAE uses a mean absolute error as the objective function (interval type only); MCE uses a misclassification rate as the objective function (nominal type only); MCLL uses a multiclass log loss as the objective function (nominal type only); MISC uses a misclassification error percentage as the objective function (nominal type only); MSE uses a mean squared error as the objective function (interval type only); MSLE uses a mean squared logarithmic error as the objective function (interval type only); RASE uses a root average squared error as the objective function; RMAE uses a root mean absolute error as the objective function (interval type only); RMSLE uses a root mean squared logarithmic error as the objective function (interval type only); and TAU uses a tau coefficient as the objective function (nominal type only). Pass/Fail uses a failure flag as the objective function, Execution Time uses a test execution time as the objective function, and Memory uses a memory usage as the objective function.

In an operation 519, a tenth indicator of one or more test selection policy parameters may be received. The one or more test selection policy parameters define how additional test configurations are selected using a predictive model trained using previously executed test configurations. For example, the test prediction model type indicated in operation 514 may be used to predict whether a new test configuration succeeds or fails, to predict how much memory will be consumed by a new test configuration, to predict how much execution time will be required by a new test configuration, etc. For example, a test selection policy parameter may indicate that a prediction score that results for an indicated target variable be used to select an indicated number of test configurations each subsequent iteration. For illustration, the target variable may indicate whether execution of the test configuration was successful, the target variable may indicate a memory usage by the test configuration, the target variable may indicate an execution time used by the test configuration, etc. The prediction score may predict a probability that the test configuration was successful or conversely unsuccessful (failed); the prediction score may predict a memory usage; the prediction score may predict an execution time; etc.

Another test selection policy parameter that may be indicated using the tenth indicator includes an entropy score that may be indicated to use instead of the prediction score. Test configurations may be selected based on maximum or minimum values for the prediction score or entropy score.

Multiple target variables may be indicated. For example, for performance testing, the objective may be to identify test configurations that consume a lot of memory or result in a large execution time. To achieve this test purpose, the memory usage and test execution time may both be indicated as target variables and a number of test configurations to select for each target variable may be indicated using the tenth indicator.

In an alternative embodiment, the tenth indicator may not be received. For example, a default value(s) may be stored, for example, in computer-readable medium 208 and used automatically. For example, the default one or more test selection policy parameters may indicate a target variable that identifies whether execution of the test configuration was successful and uses a maximum entropy score to select the next test configurations that includes two new test configurations.

In an operation 520, an eleventh indicator may be received that provides a predefined set of test configurations to execute initially. When the predefined set of test configurations to execute initially is not indicated by the eleventh indicator, the set of test configurations to execute initially may be generated randomly. In an alternative embodiment, the eleventh indicator may not be received. For example, a default value(s) may be stored, for example, in computer-readable medium 208 and used automatically. For example, the default value may indicate to generate a predefined number of initial test configurations randomly. In another alternative embodiment, a fixed, predefined value(s) may be used for each test configuration.

In an operation 522, the test parameters that may include the parameters indicated in operations 502 to 520 are made available to test manager device 104. For example, the values of any of the parameters that are not default values may be sent to test manager device 104. As another option, a location of the values of any of the parameters that are not default values may be sent to test manager device 104.

In an operation 524, a test of software to test 314 is requested of test manager device 104 using the provided test parameters.

In an operation 526, test evaluation results are accessed. For example, an indicator may be received that indicates that the testing process is complete. For example, one or more output tables may be presented on display 216 when the testing process is complete. As another option, display 216 may present a statement indicating that the testing process is complete. The user can then access the output tables in the specified location. The output tables may summarize the testing results that may include the results stored in test history data 320.

Figure 6A:
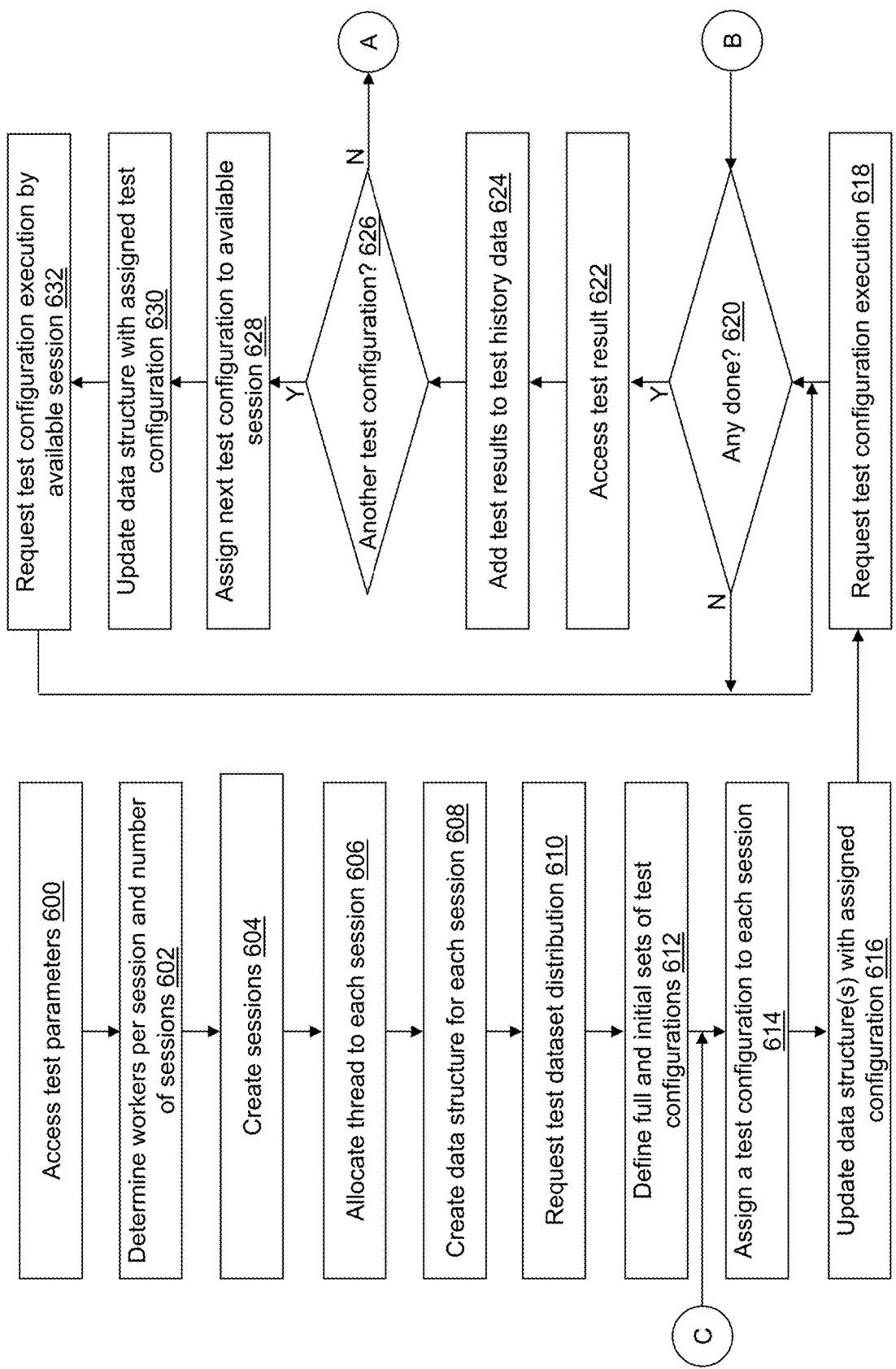
FIGS. 6A and 6B depict a flow diagram illustrating examples of operations performed by the test manager device of FIG. 3 in accordance with an illustrative embodiment.
Figure 6B:
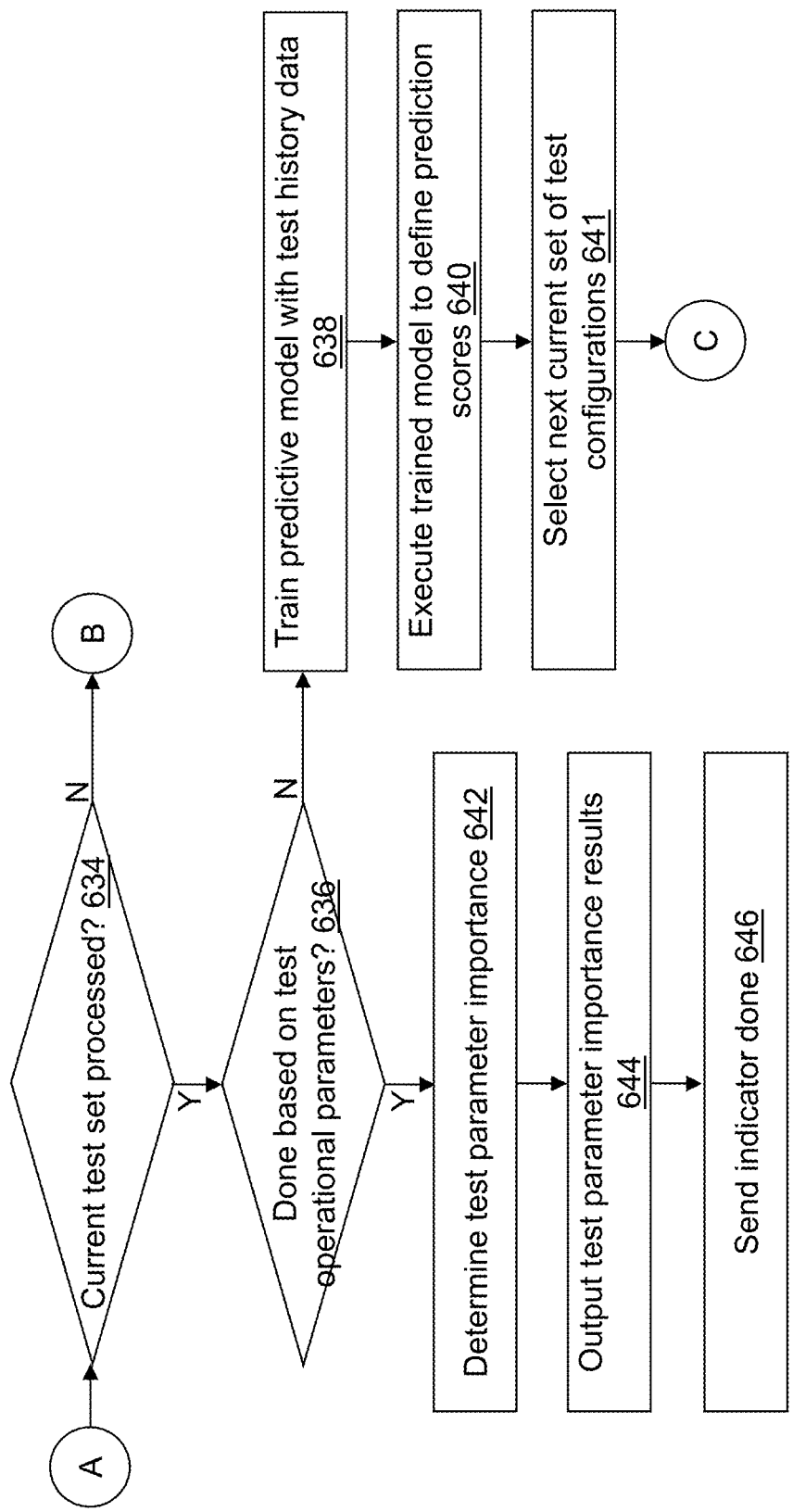

Referring to FIGS. 6A and 6B, example operations associated with test execution manager application 312 are described. Additional, fewer, or different operations may be performed depending on the embodiment. The order of presentation of the operations of FIGS. 6A and 6B is not intended to be limiting. Test manager device 104 establishes communication with the computing devices of worker system 106, sends instructions to each session manager device 400 associated with each session established by test manager device 104, collects and aggregates the results of computations from each session, and communicates final results to user device 200. Test manager device 104 may utilize itself as a worker computing device of worker system 106. The computing devices of worker system 106 receive instructions from test manager device 104, store and process data, and send the results of computations back to test manager device 104 under control of each session manager device 400 of each session. Worker computing devices of each session may also communicate to each other directly to complete tasks.

In an operation 600, test parameters obtained by model test execution application 222 are accessed. For example, values for parameters indicated in operations 502 to 520 and made available to test manager device 104 in operation 520 are accessed.

In an operation 602, the number of workers per session P and the number of sessions N are determined. For example, when the first indicator specifies N, that value is used for the number of sessions, or when the first indicator specifies P, that value is used for the number of workers per session. If W is equal to all of the workers that are connected to test manager device 104 and there are at least 16 worker computing devices included in worker system 106, N may be limited to eight so that the number of workers per session P is at least two. Optionally, the second indicator may indicate that P is set based on a size of the test dataset.

When N is greater than one and P is equal to one, test execution manager application 312 is executed in a model parallel mode; when P is greater than one and N is equal to one, test execution manager application 312 is executed in a data parallel mode; and when both P and N are greater than one, test execution manager application 312 is executed in a data and model parallel mode. In an automatic mode, N may be selected to be as large as possible with P as small as possible subject to the size of the test dataset because model parallel is more efficient than data parallel.

In an operation 604, the number of sessions N are created to include the number of workers per session P with session manager device 400 selected for each created session.

In an operation 606, a thread is allocated from an available thread pool to each created session. The allocated threads each manage the communications between test manager device 104 and each session manager device 400.

In an operation 608, a data structure is created for each session through which each session is notified of the test dataset, of the test parameter values for the assigned test configuration, of software to test 314, etc. An illustrative data structure includes a thread identifier that links the data structure to each thread, a session handle for the thread, a parameter list for testing software to test 314, a data filter for the test dataset, a test time, a completion indicator, etc. Other methods for communicating with the computing devices of worker system 106 may be used in alternative embodiments.

In an operation 610, a request is sent to each session manager device 400 to distribute the test dataset across each session worker device 420 when P>1 or to load the test dataset when P=1.

In an operation 612, a full set of test configurations is defined based on the test parameter values to evaluate indicated in operation 512, and a set of initial test configurations is selected randomly from the full set of test configurations unless the predefined set of initial test configurations was provided in operation 520. When the predefined set of initial test configurations was provided in operation 520, the set of initial test configurations are the predefined set of initial test configurations. The set of initial test configurations includes the number of initial test configurations indicated in operation 510. The set of initial test configurations may be associated with a first iteration of testing and a current set of test configurations.

Each test configuration of the full set of test configurations includes a value selected for each test parameter value to evaluate indicated in operation 512 based on the parameter value range, the parameter sampling method, and the selection probability. The full set of test configurations may be stored in test configuration data 316. The number of test configurations to generate may be included in the full set of test configurations.

In an operation 614, each test configuration is selected from the current set of test configurations and assigned to a session. Depending on the number of sessions N and a number of test configurations T included in the current set of test configurations, all or less than all of the sessions may be assigned a test configuration when T≤N. When T>N, one or more test configurations may be assigned after an assigned test configuration completes execution.

In an operation 616, the data structure associated with each session is loaded with the assigned test configuration.

In an operation 618, a request is sent to each session manager device 400 to execute software to test 314 with the assigned test configuration based on the test parameter values stored in the data structure.

In an operation 620, a determination is made concerning whether or not any execution is done. For example, session manager device 400 may set the completion indicator to indicate done in the data structure associated with it. If no execution is done, processing continues in operation 620 until indication that a session is done is received. If any execution is done, processing continues in an operation 622. For illustration, test manager device 104 loops through each of its thread handles, checking to see if that particular thread is busy or free. When a session finishes executing its assigned test configuration, session manager device 400 returns the computed values back to test manager device 104 and sets its completion indicator indicating that it is available to receive a new test configuration for execution.

In operation 622, results generated by the now available session are accessed.

In an operation 624, the test configuration and the configuration results are stored in test history data 320. Table 1 below provides a list of parameters that may be stored in test history data 320.

TABLE 1

| Parameter Name | Parameter Description |
|---|---|
| test ID | ID of test configuration |
| testOpts | Option combinations of test that is a string created from the selected test parameter values to evaluate |
| severity | A severity code that indicates whether the software execution succeeded or failed.<br>0-Indicates that the software execution completed successfully.<br>1-Indicates a minor issue that did not prevent the software execution from completing successfully.<br>2-Indicates an error that prevented the software execution from completing successfully.<br>The reason code may provide additional information. |
| reason | A reason code provides general information about the status code. Illustrative code values include:<br>0-Indicates that the software execution completed successfully.<br>1-Indicates a permission problem.<br>2-Indicates a network problem during connection or a network connection failure.<br>3-Indicates an insufficient memory condition.<br>4-Indicates an authentication error.<br>5-Indicates an unexpected error condition that prevented the software execution from completing successfully.<br>6-Indicates a severe error condition that cause the software execution to terminate. |
| status | The action status code returned by software to test 314. |
| duration | Execution time required for test execution. |
| memory | Memory consumed by the test execution. |
| cancelled | Indicates whether the test was cancelled or not. |
| testParameters | List of each hyperparameter and its associated value defined for the test configuration executed. |

In an operation 626, a determination is made concerning whether or not the current set of test configurations includes another test configuration to evaluate that has not been assigned to a session. If the current set of test configurations includes another test configuration to evaluate, processing continues in an operation 628. If the current set of test configurations does not include another test configuration to evaluate, processing continues in an operation 634 shown referring to FIG. 6B.

In operation 628, a next test configuration is selected from the current set of test configurations and assigned to the now available session.

In an operation 630, the data structure associated with the now available session is loaded with the next assigned test configuration.

In an operation 632, a request is sent to session manager device 400 associated with the now available session to execute software to test 314 with the test configuration included in the data structure, and processing continues in operation 620 to continue to monitor for sessions that have completed their assigned test configuration execution.

Referring to FIG. 6B, in operation 634, a determination is made concerning whether or not the iteration is done such that execution of each test configuration in the current set of test configurations has completed. If the iteration is done, processing continues in an operation 636. If the iteration is not done, processing continues in operation 620 to continue to wait for sessions to complete execution with their assigned test configuration.

In operation 636, a determination is made concerning whether or not processing should be stopped. If processing should be stopped, processing continues in an operation 642. If processing should not be stopped, processing continues in an operation 638. For example, processing is terminated when a maximum number of iterations have been performed, when a maximum number of test configuration evaluations have been performed, when a maximum time (computing time or wall clock time) has been exceeded, etc. based on the test operational parameter values indicated in operation 510.

In operation 638, a predictive model of the test prediction model type indicated in operation 514 is trained using the hyperparameter values to evaluate indicated in operation 516. For example, the predictive model may be trained using an autotune process to select a best trained predictive model based on the objective function value(s) indicated in operation 518. The predictive model is trained with the data stored in test history data 320 using the target variable value indicated in operation 519 that is one or more of the parameters stored in test history data 320. For example, when whether a new test configuration succeeds or fails is the target variable, the "severity" or "reason" value may be the target variable value. As another example, when how much memory will be consumed by a new test configuration is the target variable, the "memory" value may be the target variable value. As yet another example, when how much execution time will be required by a new test configuration is the target variable, the "duration" value may be the target variable value. By default, remaining parameters included in test history data 320 are used as predictor variables.

For illustration, when Bayesian Optimizer is the indicated test prediction model type, an acquisition function may be optimized over a Gaussian process to train the predictive model. Bayesian optimization is a sequential design strategy for global optimization of black-box functions that does not assume any functional forms. If the test parameters are treated as hyperparameters, a continuous test objective as the objective function, and the interactions between test parameters and the objective function as a black-box function, Bayesian optimization can be used to build a surrogate model for the black-box function between hyperparameters and the objective function based on the observations using an acquisition function to select the next test configuration. The observations are the test configurations and associated results stored in test history data 320. The acquisition function evaluates points in the search space and a location propose function finds points that will likely lead to maximum improvement and are worth trying. The acquisition function trades off exploitation and exploration. Exploitation selects points having high objective predictions, while exploration selects points having high variance. In an illustrative embodiment, an expected improvement may be used as the acquisition function. Bayesian optimization may be used to drive testing to achieve a maximum absolute difference between a benchmark result and a test result.

The expected improvement can be defined as $$EI(x) = \mathbb{E} \max(f(x) - f(x^+), 0) \qquad (1)$$

where $f(x^+)$ is a value of a best test configuration so far, $x^+$ is a location of the best test configuration so far. The expected improvement can be evaluated analytically under the Gaussian Process model:

$$EI(x) = \begin{cases} (\mu(x) - f(x^+) - \xi)\Phi(Z) + \sigma(x)\phi(Z), \text{ if } \sigma(x) > 0 \\ 0, \text{ if } \sigma(x) = 0 \end{cases} \quad (2)$$

where μt(x) and σ(x) are the mean and the standard deviation of the Gaussian posterior predictive at x, respectively. Φ and ϕ are the cumulative distribution function and the probability density function of a standard normal distribution, respectively. The first summation term in equation (2) is the exploitation term and the second summation term is the exploration term. Parameter ξ determines an amount of exploration during optimization with higher values leading to more exploration. In other words, with increasing values for parameter ξ, the importance of improvements predicted by the Gaussian Process posterior mean decreases relative to the importance of potential improvements in regions of high prediction uncertainty, represented by large σ(x) values. An illustrative default value for ξ is 0.01.

In an operation 640, the trained predictive model is executed with the full set of test configurations to determine a prediction score for each target variable indicated in operation 519. Any test configurations that have been executed previously and stored in test history data 320 may be removed from the full set of test configurations to avoid selecting the same test configuration on a subsequent iteration.

When Bayesian Optimizer is the indicated test prediction model type, a Gaussian process regression model is used to compute the mean μ(x) and the standard deviation σ(x) of the Gaussian posterior predictive for each test configuration x. Given the previously executed test configurations, predictions of new test configurations can be calculated using the equations below. The standard deviation is the square root of the diagonal of the covariance matrix.

$$\bar{f}_* = K_*^T[K+\sigma_n^2 I]^{-1} y$$

$$\text{cov}(f_*) = K_{**} - K_*^T[K+\sigma_n^2 I]^{-1} K_*$$

where $\bar{f}_*$ is a mean of the Gaussian posterior predictive at $x_*$, $\text{cov}(f_*)$ is a covariance of the Gaussian posterior predictive at $x_*$, K is a kernel matrix computed using a predefined kernel function with the previously executed test configurations, $K_*$ is a second kernel matrix computed using the predefined kernel function between the previously executed test configurations and the full set of test configurations (with the previously executed test configurations removed), y is a function values observed at an executed test configuration, $K_{**}$ is a kernel matrix computed using the predefined kernel function with the full set of test configurations (with the previously executed test configurations removed), $\sigma_n^2$ is a predefined variance of the noise, T indicates a matrix transpose, and I indicates an identity matrix.

In an operation 641, the number of test configurations to select each subsequent iteration are selected based on the prediction score and/or entropy score and used to define a next current set of test configurations. Processing continues in operation 614 to execute each selected test configuration and store the results in test history data 320.

For example, if the test selection policy parameters indicated in operation 519 were whether execution of the test configuration was successful using a maximum prediction score for a successful test to select two new test configurations from five test configurations included in the full set of test configurations, Table 2 presents the results

TABLE 2

| Test Identifier | Prediction score |
| --- | --- |
| 1 | 0.9 |
| 2 | 0.3 |
| 3 | 0.8 |
| 4 | 0.4 |
| 5 | 0.51 |

The test configurations from the full set of test configurations that are associated with test identifier (ID) 1 and test ID 3 are selected as the next current set of test configurations.

As another example, if the test selection policy parameters indicated in operation 519 were a memory consumption using a maximum prediction score to select two new test configurations from five test configurations included in the full set of test configurations, Table 3 presents the results

TABLE 3

| Test Identifier | Prediction score |
| --- | --- |
| 1 | 32 |
| 2 | 10 |
| 3 | 23 |
| 4 | 40 |
| 5 | 80 |

The test configurations from the full set of test configurations that are associated with test ID 5 and test ID 4 are selected as the next current set of test configurations.

As yet another example, if the test selection policy parameters indicated in operation 519 were whether execution of the test configuration was successful using a maximum entropy score for a successful test to select two new test configurations from five test configurations included in the full set of test configurations, Table 4 presents the results

TABLE 4

| Test Identifier | Prediction score | Entropy score |
| --- | --- | --- |
| 1 | 0.9 | 0.141182 |
| 2 | 0.3 | 0.265295 |
| 3 | 0.8 | 0.217322 |
| 4 | 0.4 | 0.292285 |
| 5 | 0.51 | 0.300943 |

The test configurations from the full set of test configurations that are associated with test ID 5 and test ID 4 are selected as the next current set of test configurations. The entropy score may be computed using $H(x) = -\Sigma_{y \in Y} P(y|x) \log P(y|x)$, where H(x) is the entropy score, P(y|x) is a posterior probability of a predicted test result y given a respective test configuration x of the second plurality of test configurations, and Y is a set of possible test results. For example, for test ID 1, $-0.9*\log(0.9)-0.1*\log(0.1)=0.141182$, where the possible test results are 1 for a successful test and 0 for a failed test.

For example, if the test selection policy parameters indicated in operation 519 were whether execution of the test configuration was successful using a maximum prediction score to select two new test configurations and using a maximum entropy score to select two new test configurations. The test configurations from the full set of test configurations that are associated with test ID 1, test ID 3, test ID 5, and test ID 4 are selected as the next current set of test configurations.

Figure 8:
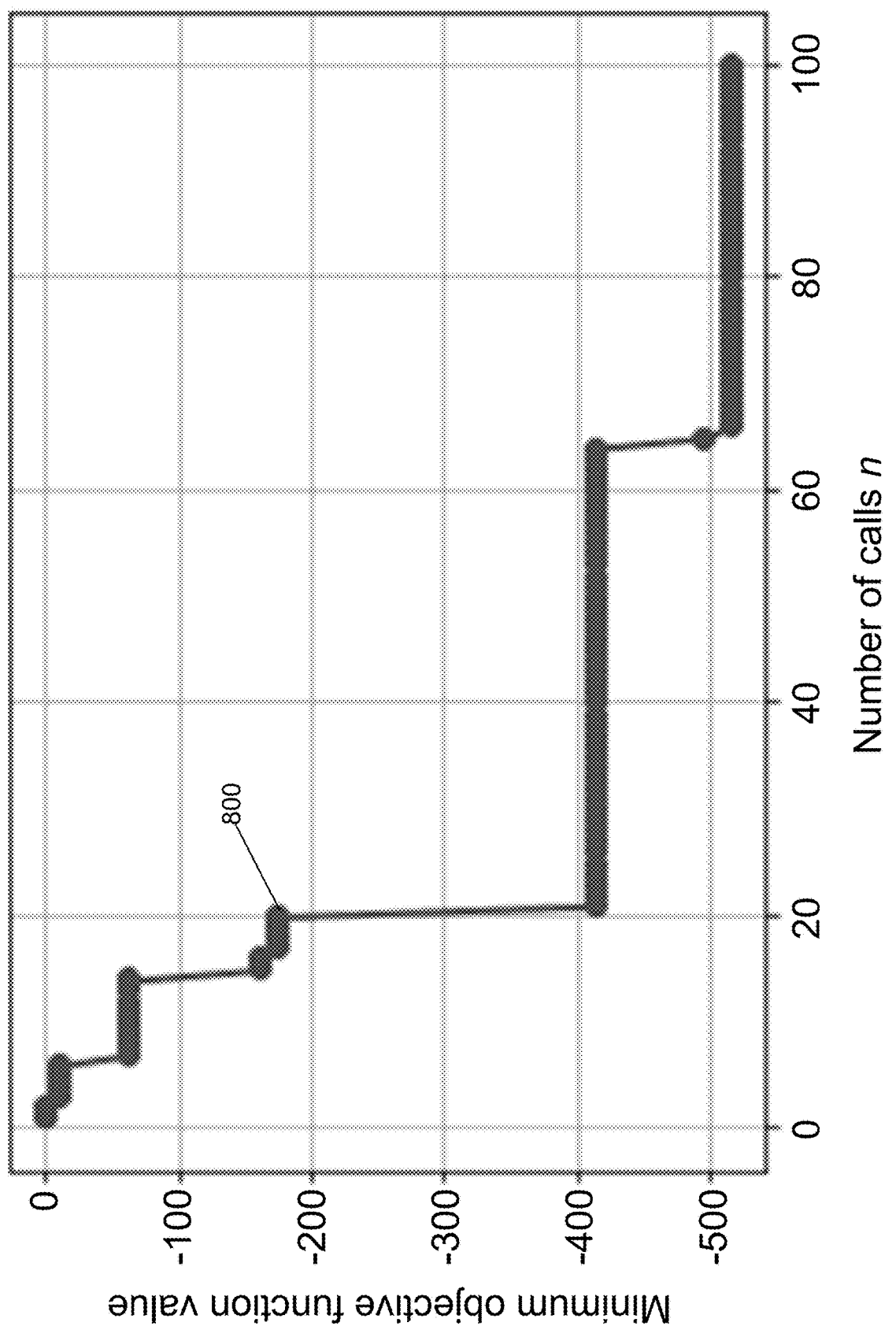
FIG. 8 shows a minimum objective function value computed for a plurality of test configuration evaluations by the test system of FIG. 1 in accordance with an illustrative embodiment.

For further illustration, executing the Bayesian optimization pseudocode to maximize a difference between the expected result and the actual result resulted in a maximum difference of −515.903 over 100 test configurations. The test configuration that resulted in this maximum difference included maxlag=14, RNNType=2, miniBatchSize=25, maxEpochs=200, nNeuronH=55, algorithm=2, learningrate=0.028429, learningPolicy=3, beta1=0.994785, beta2=0.737308, clipGradMax=6098, clipGradMin=−5819, gamma=0.567829, momentum=0.715817, power=0.515564, stepSize=11, and seed=10970897. The Bayesian optimization predictive model generated 100 test configurations. Referring to FIG. 8, a minimum absolute value of the result differences for the 100 test configurations is shown in accordance with an illustrative embodiment. Curve 800 shown referring to FIG. 8, shows that an absolute value of the result differences increased over the optimization iterations.

Referring again to FIG. 6B, in operation 642, an importance or significance of each test parameter is determined. The importance or significance is a measure of how much each test parameter contributes to the value of the objective function(s) that result from each test execution. For example, the test parameter importance determination may be performed using the methods described in U.S. Pat. No. 10,600,005 and in U.S. Pat. No. 10,963,802. For illustration, an autotuned random forest model may be trained to determine each test parameters importance and relative importance using test history data 320. By quantifying each test parameter's contribution unimportant variables can be filtered from new test configurations saving computing resources.

Figure 9:
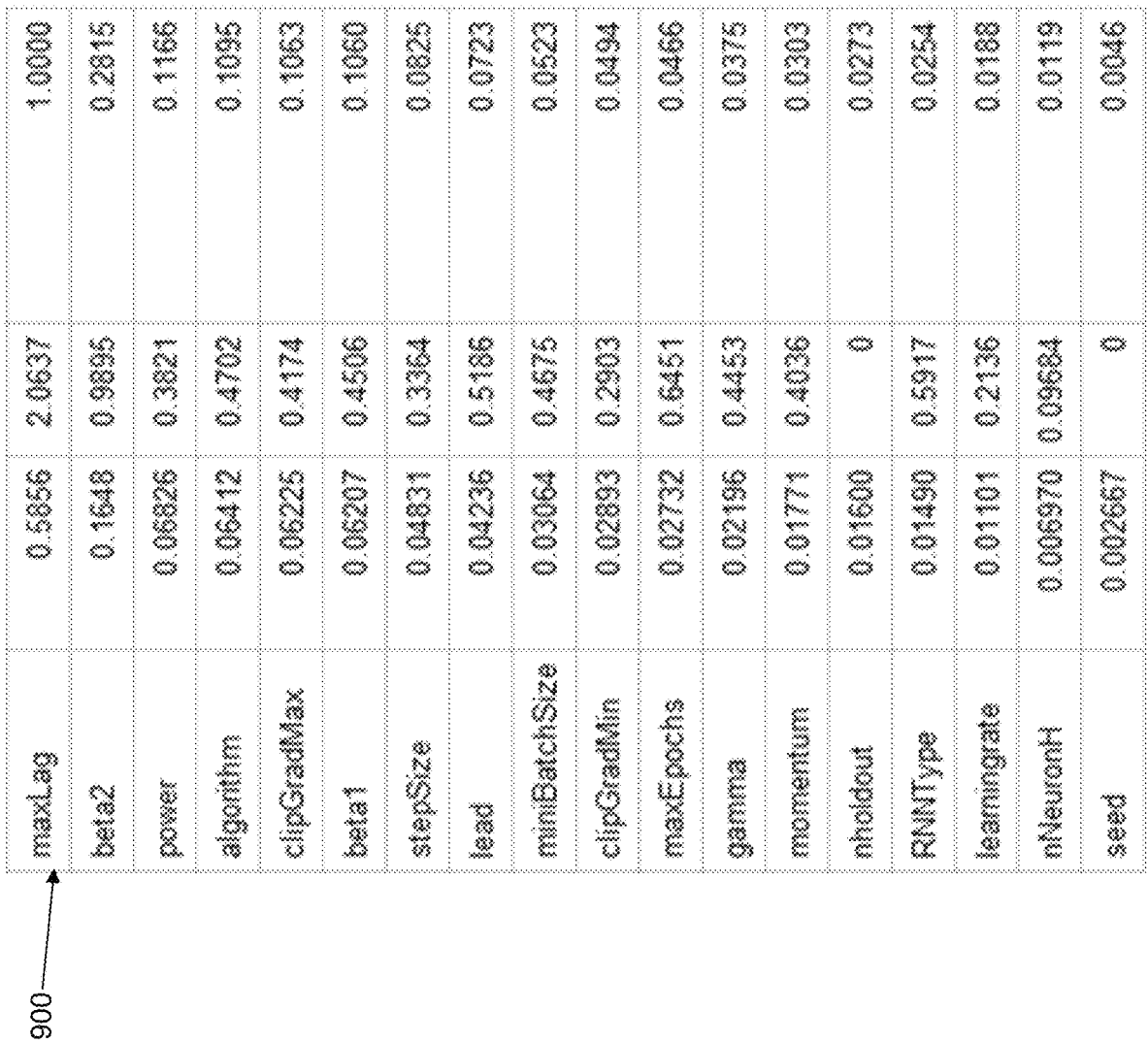
FIG. 9 shows a test variable importance computed by the test system of FIG. 1 in accordance with an illustrative embodiment.

For illustration, the action validateTSModel.validateTSDL was tested. Referring to FIG. 9, a test variable importance table 900 is shown in accordance with an illustrative embodiment. A first column of test variable importance table 900 indicates a test parameter name. A second column of test variable importance table 900 indicates an importance value of the associated test parameter name. A third column of test variable importance table 900 indicates a standard deviation of the importance value of the associated test parameter name. A fourth column of test variable importance table 900 indicates a relative importance value of the associated test parameter name. The test parameter named maxLag was identified as having the highest importance value meaning that the test parameter named maxLag contributed most to the failed tests. During the testing process, a software bug was identified for the numerical validation codes that did not properly handle a test parameter value of maxLag=1. The test parameter importance focused the tester on the proper test parameter.

Referring again to FIG. 6B, in an operation 644, the importance or significance of each test parameter is output to parameter importance data 322.

In an operation 646, a done indicator is sent to user device 200.

Figure 7B:
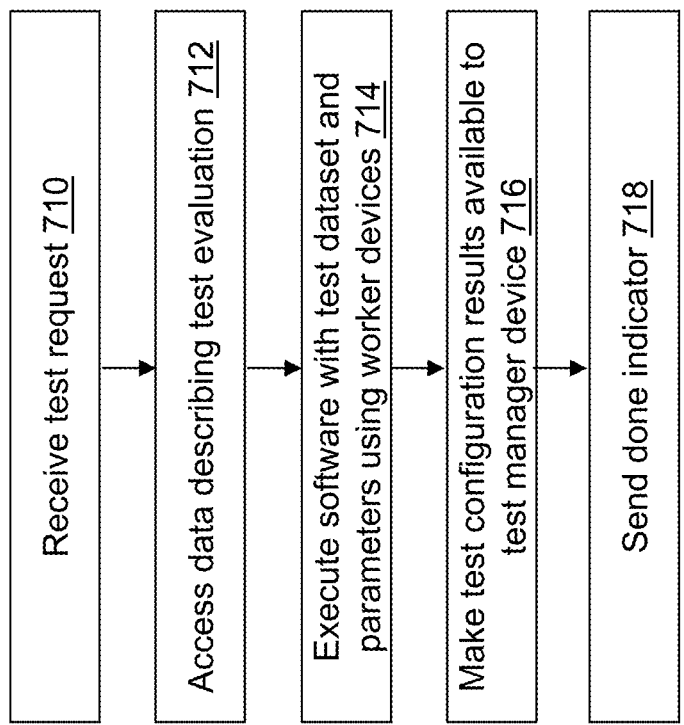
FIGS. 7A and 7B depict a flow diagram illustrating examples of operations performed by the session manager device of FIG. 4A in accordance with an illustrative embodiment.
Figure 7A:

Referring to FIGS. 7A and 7B, example operations associated with model execution manager application 412 are described. Additional, fewer, or different operations may be performed depending on the embodiment. The order of presentation of the operations of FIGS. 7A and 7B is not intended to be limiting. FIG. 7A shows operations in response to the request in operation 610 from test manager device 104; whereas, FIG. 7B shows operations in response to the request in operation 618 from test manager device 104.

Referring to FIG. 7A, in an operation 700, an indicator of worker devices in the session to which session manager device 400 is assigned is received from test manager device 104 in the request initiated by operation 610.

In an operation 702, the test dataset is loaded and distributed across the computing devices of the session such that each computing device is loaded with a portion of the test dataset when P>1. When P=1, the test dataset may be loaded on session manager device 400 of each session.

Referring to FIG. 7B, in an operation 710, the test request sent by test manager device 104 in operation 610 is received by session manager device 400.

In an operation 712, the data describing the test configuration is accessed. For example, data in the data structure associated with the thread is accessed. Software to test 314 is further accessed either using the data structure or another mechanism.

In an operation 714, software to test 314 is executed using the test configuration accessed and test dataset subset 434 at each session worker device 420 and optionally test dataset subset 414 at session manager device 400 when session manager device 400 is also acting as a worker in a session or there is a single worker computing device in each session.

In an operation 716, the test configuration results are made available to test manager device 104, for example, by including them in the data structure, updating a globally accessible table, etc.

In an operation 718, the completion indicator of the data structure is set to notify test manager device 104 that processing of the test configuration is complete. Model test execution application 222, test execution manager application 312, model execution manager application 412, and model execution worker application 432 automatically test software to test 314 generating new test configurations based on a predictive model trained to define test configurations that identify model errors/failures and/or performance degradations more efficiently thereby requiring fewer computing resources and less user time. For example, using an autotuned random forest model to define new test configurations in comparison to a pure random selection for each new test configuration, a test failure percent increased from 7% to 20%. Thus, the new test configurations defined using the autotuned random forest model successfully identified more test failures.

Given the inherent expense of testing numerous test configurations, model test execution application 222, test execution manager application 312, model execution manager application 412, and model execution worker application 432 provide efficient distributed and parallel computing device implementations for testing software. The presented results demonstrate the improved test coverage.

Test system 100 can fully leverage a human's domain expertise and advanced analytics in identifying software bugs. Testers can specify skeptical test configurations which may trigger bugs via initial points. Sometimes, experienced testers can identify software problems very quickly without the need of for intensive tests. By integrating a human's domain expertise and advanced analytics, bugs can be caught with very few tests and saving many computation resources.

The explosion of digital data is generating many opportunities for big data analytics, which in turn provides many opportunities for applying predictive models to capitalize on the information contained in the data—to make better predictions that lead to better decisions. Test system 100 supports better decision making by providing a system that can identify and evaluate many more test configurations in parallel by allocating the computing devices of worker system 106 in an effective data and model parallel manner. With a thorough and efficient testing regime, predictive models can be confidently applied to capitalize on the information contained in the data.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   (A) execute software under test with a first plurality of test configurations to generate a test result for each test configuration of the first plurality of test configurations, wherein each test configuration of the first plurality of test configurations includes a value for each test parameter of a plurality of test parameters, wherein each test parameter of the plurality of test parameters is an input to the software under test, wherein the test result includes at least one of a severity code, a memory consumption value, or an execution time value, wherein the severity code indicates whether or not execution of the software under test failed using a respective test configuration, wherein the memory consumption value indicates an amount of computer memory used for execution of the software under test using the respective test configuration, wherein the execution time value indicates an amount of time used for execution of the software under test using the respective test configuration;
   (B) train a predictive model using each test configuration of the first plurality of test configurations and a target variable value that is the test result generated for each test configuration of the first plurality of test configurations based on an objective function value;
   (C) execute the trained predictive model with a second plurality of test configurations to predict the test result for each test configuration of the second plurality of test configurations, wherein each test configuration of the second plurality of test configurations includes the value for each test parameter of the plurality of test parameters;
   (D) select a predefined number of test configurations from the second plurality of test configurations based on the predicted test result for each test configuration of the second plurality of test configurations, wherein the selected predefined number of test configurations define a third plurality of test configurations, wherein the third plurality of test configurations are selected to maximize the memory consumption value or the execution time value or to result in failed execution of the software under test;
   (E) execute the software under test with the defined third plurality of test configurations to generate the test result for each test configuration of the third plurality of test configurations, wherein each test configuration of the third plurality of test configurations includes the value for each test parameter of the plurality of test parameters;
   (AA) retrain the predictive model using each test configuration of the first plurality of test configurations in association with the test result generated for each test configuration of the first plurality of test configurations and using each test configuration of the third plurality of test configurations in association with the test result generated for each test configuration of the third plurality of test configurations;
   (BB) update the second plurality of test configurations by removing the third plurality of test configurations from the second plurality of test configurations;
   (CC) execute the predictive model retrained in (AA) with the updated second plurality of test configurations to predict the test result for each test configuration of the second plurality of test configurations;
   (DD) select the predefined number of test configurations from the updated second plurality of test configurations based on the predicted test result for each test configuration of the second plurality of test configurations in (CC), wherein the selected predefined number of test configurations define a fourth plurality of test configurations, wherein each test configuration of the fourth plurality of test configurations includes the value for each test parameter of the plurality of test parameters, wherein each test configuration of the fourth plurality of test configurations is unique relative to other test configurations of the fourth plurality of test configurations and is unique relative to the first plurality of test configurations and relative to the third plurality of test configurations;
   (EE) execute the software under test with the fourth plurality of test configurations to generate the test result for each test configuration of the fourth plurality of test configurations; and
   (F) output the generated test result for each test configuration of the first plurality of test configurations, for each test configuration of the third plurality of test configurations, and for each test configuration of the fourth plurality of test configurations to identify errors in the software under test.

2. The non-transitory computer-readable medium of claim 1, wherein a model type of the predictive model is a random forest model type.

3. The non-transitory computer-readable medium of claim 1, wherein a model type of the predictive model is a Bayesian optimization model type.

4. The non-transitory computer-readable medium of claim 1, wherein after (E), the computer-readable instructions further cause the computing device to:
   determine an importance value for each test parameter of the plurality of test parameters using a second predictive model trained using each test configuration of the first plurality of test configurations in association with the test result generated for each test configuration of the first plurality of test configurations, and using each test configuration of the third plurality of test configurations in association with the test result generated for each test configuration of the third plurality of test configurations; and
   output the determined importance value for each test parameter of the plurality of test parameters.

5. The non-transitory computer-readable medium of claim 4, wherein a model type of the second predictive model is a random forest model type.

6. The non-transitory computer-readable medium of claim 1, wherein each test configuration of the first plurality of test configurations is unique relative to other test configurations of the first plurality of test configurations.

7. The non-transitory computer-readable medium of claim 1, wherein each test configuration of the third plurality of test configurations is unique relative to other test configurations of the third plurality of test configurations and is unique relative to the first plurality of test configurations.

8. The non-transitory computer-readable medium of claim 4, wherein a highest determined importance value for a test parameter of the plurality of test parameters indicates that the test parameter contributed most to the test result generated for each test configuration of the first plurality of test configurations.

9. The non-transitory computer-readable medium of claim 1, wherein before (A), the computer-readable instructions further cause the computing device to define a plurality of test configurations based on random selection of a value for each test parameter of the plurality of test parameters, wherein the value is selected between a minimum value and a maximum value defined for each test parameter of the plurality of test parameters, wherein the first plurality of test configurations are randomly selected from the defined plurality of test configurations.

10. The non-transitory computer-readable medium of claim 9, wherein the second plurality of test configurations are the defined plurality of test configurations after excluding the selected first plurality of test configurations.

11. The non-transitory computer-readable medium of claim 1, wherein before (A), the computer-readable instructions further cause the computing device to define the first plurality of test configurations based on random selection of a value for each test parameter of the plurality of test parameters, wherein the value is selected between a minimum value and a maximum value defined for each test parameter of the plurality of test parameters.

12. The non-transitory computer-readable medium of claim 11, wherein the value is selected based on a sampling method defined for each test parameter of the plurality of test parameters.

13. The non-transitory computer-readable medium of claim 1, wherein before (A), the computer-readable instructions further cause the computing device to define a plurality of test configurations based on random selection of a value for each test parameter of the plurality of test parameters, wherein the value is selected between a minimum value and a maximum value defined for each test parameter of the plurality of test parameters, wherein the first plurality of test configurations are randomly selected from the defined plurality of test configurations.

14. The non-transitory computer-readable medium of claim 13, wherein the second plurality of test configurations are the defined plurality of test configurations after excluding the selected first plurality of test configurations.

15. The non-transitory computer-readable medium of claim 1, wherein in (A), the software under test is executed in parallel using a plurality of sessions, wherein each session of the plurality of sessions is assigned a different test configuration of the first plurality of test configurations.

16. The non-transitory computer-readable medium of claim 15, wherein each session of the plurality of sessions includes a plurality of worker computing devices.

17. The non-transitory computer-readable medium of claim 16, wherein in (A), the software under test is executed with a test dataset input to the software under test, wherein the test dataset is distributed across the plurality of worker computing devices of each session of the plurality of sessions.

18. The non-transitory computer-readable medium of claim 1, wherein in (E), the software under test is executed in parallel using a plurality of sessions, wherein each session of the plurality of sessions is assigned a different test configuration of the third plurality of test configurations.

19. The non-transitory computer-readable medium of claim 18, wherein each session of the plurality of sessions includes a plurality of worker computing devices.

20. The non-transitory computer-readable medium of claim 19, wherein in (A), the software under test is executed with a test dataset input to the software under test, wherein the test dataset is distributed across the plurality of worker computing devices of each session of the plurality of sessions.

21. The non-transitory computer-readable medium of claim 1, wherein the predicted test result is a probability that execution of the software under test with a test configuration of the third plurality of test configurations has the severity code that indicates execution of the software under test failed.

22. The non-transitory computer-readable medium of claim 1, wherein the predicted test result is a memory consumption by the software under test with a test configuration of the third plurality of test configurations.

23. The non-transitory computer-readable medium of claim 1, wherein the predicted test result is an execution time required by the software under test with a test configuration of the third plurality of test configurations.

24. The non-transitory computer-readable medium of claim 1, wherein the predefined number of test configurations are selected from the second plurality of test configurations based on an entropy score value computed from the predicted test result.

25. The non-transitory computer-readable medium of claim 24, wherein the predefined number of test configurations are selected based on having maximum values for the entropy score value computed from the predicted test result.

26. The non-transitory computer-readable medium of claim 24, wherein the entropy score is computed using $H(x)=-\Sigma_{y \in Y} P(y|x) \log P(y|x)$, where $H(x)$ is an entropy score value, $P(y|x)$ is a posterior probability of a predicted test result y given a respective test configuration x of the second plurality of test configurations, and Y is a set of possible test results.

27. The non-transitory computer-readable medium of claim 1, wherein the predefined number of test configurations are selected based on having maximum values for the predicted test result.

28. The non-transitory computer-readable medium of claim 1, wherein the predefined number of test configurations are further selected from the second plurality of test configurations based on a second predicted test result.

29. A computing device comprising:
a processor; and
a computer-readable medium operably coupled to the processor, the computer-readable medium having computer-readable instructions stored thereon that, when executed by the processor, cause the computing device to
  execute software under test with a first plurality of test configurations to generate a test result for each test configuration of the first plurality of test configurations, wherein each test configuration of the first plurality of test configurations includes a value for each test parameter of the plurality of test parameters, wherein each test parameter of the plurality of test parameters is an input to the software under test, wherein the test result includes at least one of a severity code, a memory consumption value, or an execution time value, wherein the severity code indicates whether or not execution of the software under test failed using a respective test configuration, wherein the memory consumption value indicates an amount of computer memory used for execution of the software under test using the respective test configuration, wherein the execution time value indicates an amount of time used for execution of the software under test using the respective test configuration;
  train a predictive model using each test configuration of the first plurality of test configurations and a target variable value that is the test result generated for each test configuration of the first plurality of test configurations based on an objective function value;
  execute the trained predictive model with a second plurality of test configurations to predict the test result for each test configuration of the second plurality of test configurations, wherein each test configuration of the second plurality of test configurations includes the value for each test parameter of the plurality of test parameters;
  select a predefined number of test configurations from the second plurality of test configurations based on the predicted test result for each test configuration of the second plurality of test configurations, wherein the selected predefined number of test configurations define a third plurality of test configurations, wherein the third plurality of test configurations are selected to maximize the memory consumption value or the execution time value or to result in failed execution of the software under test;
  execute the software under test with the defined third plurality of test configurations to generate the test result for each test configuration of the third plurality of test configurations, wherein each test configuration of the third plurality of test configurations includes the value for each test parameter of the plurality of test parameters;
  (AA) retrain the predictive model using each test configuration of the first plurality of test configurations in association with the test result generated for each test configuration of the first plurality of test configurations and using each test configuration of the third plurality of test configurations in association with the test result generated for each test configuration of the third plurality of test configurations;
  (BB) update the second plurality of test configurations by removing the third plurality of test configurations from the second plurality of test configurations;
  (CC) execute the predictive model retrained in (AA) with the updated second plurality of test configurations to predict the test result for each test configuration of the second plurality of test configurations;
  (DD) select the predefined number of test configurations from the updated second plurality of test configurations based on the predicted test result for each test configuration of the second plurality of test configurations in (CC), wherein the selected predefined number of test configurations define a fourth plurality of test configurations, wherein each test configuration of the fourth plurality of test configurations includes the value for each test parameter of the plurality of test parameters, wherein each test configuration of the fourth plurality of test configurations is unique relative to other test configurations of the fourth plurality of test configurations and is unique relative to the first plurality of test configurations and relative to the third plurality of test configurations;
  (EE) execute the software under test with the fourth plurality of test configurations to generate the test result for each test configuration of the fourth plurality of test configurations; and
  output the generated test result for each test configuration of the first plurality of test configurations, for each test configuration of the third plurality of test configurations, and for each test configuration of the fourth plurality of test configurations to identify errors in the software under test.

30. A method of automatically defining new test configurations for testing software, the method comprising:
executing, by a computing device, software under test with a first plurality of test configurations to generate a test result for each test configuration of the first plurality of test configurations, wherein each test configuration of the first plurality of test configurations includes a value for each test parameter of the plurality of test parameters, wherein each test parameter of the plurality of test parameters is an input to the software under test, wherein the test result includes at least one of a severity code, a memory consumption value, or an execution time value, wherein the severity code indicates whether or not execution of the software under test failed using a respective test configuration, wherein the memory consumption value indicates an amount of computer memory used for execution of the software under test using the respective test configuration, wherein the execution time value indicates an amount of time used for execution of the software under test using the respective test configuration;
training, by the computing device, a predictive model using each test configuration of the first plurality of test configurations and a target variable value that is the test result generated for each test configuration of the first plurality of test configurations based on an objective function value;

executing, by the computing device, the trained predictive model with a second plurality of test configurations to predict the test result for each test configuration of the second plurality of test configurations, wherein each test configuration of the second plurality of test configurations includes the value for each test parameter of the plurality of test parameters;

selecting, by the computing device, a predefined number of test configurations from the second plurality of test configurations based on the predicted test result for each test configuration of the second plurality of test configurations, wherein the selected predefined number of test configurations define a third plurality of test configurations, wherein the third plurality of test configurations are selected to maximize the memory consumption value or the execution time value or to result in failed execution of the software under test;

executing, by the computing device, the software under test with the defined third plurality of test configurations to generate the test result for each test configuration of the third plurality of test configurations, wherein each test configuration of the third plurality of test configurations includes the value for each test parameter of the plurality of test parameters;

(AA) retraining, by the computing device, the predictive model using each test configuration of the first plurality of test configurations in association with the test result generated for each test configuration of the first plurality of test configurations and using each test configuration of the third plurality of test configurations in association with the test result generated for each test configuration of the third plurality of test configurations;

(BB) updating, by the computing device, the second plurality of test configurations by removing the third plurality of test configurations from the second plurality of test configurations;

(CC) executing, by the computing device, the predictive model trained in (AA) with the updated second plurality of test configurations to predict the test result for each test configuration of the second plurality of test configurations;

(DD) selecting, by the computing device, the predefined number of test configurations from the updated second plurality of test configurations based on the predicted test result for each test configuration of the second plurality of test configurations in (CC), wherein the selected predefined number of test configurations define a fourth plurality of test configurations, wherein each test configuration of the fourth plurality of test configurations includes the value for each test parameter of the plurality of test parameters, wherein each test configuration of the fourth plurality of test configurations is unique relative to other test configurations of the fourth plurality of test configurations and is unique relative to the first plurality of test configurations and relative to the third plurality of test configurations;

(EE) executing, by the computing device, the software under test with the fourth plurality of test configurations to generate the test result for each test configuration of the fourth plurality of test configurations; and outputting, by the computing device, the generated test result for each test configuration of the first plurality of test configurations, for each test configuration of the third plurality of test configurations, and for each test configuration of the fourth plurality of test configurations to identify errors in the software under test.

\* \* \* \* \*

UNITED STATES PATENT AND TRADEMARK OFFICE
CERTIFICATE OF CORRECTION

PATENT NO. : 11,775,878 B2
APPLICATION NO. : 17/523607
DATED : October 3, 2023
INVENTOR(S) : Yan Gao et al.

It is certified that error appears in the above-identified patent and that said Letters Patent is hereby corrected as shown below:

In the Specification

Column 21, Line 6:
Delete the phrase "$\mu t(x)$" and replace with --$\mu(x)$--.

Column 21, Line 41:

Delete the phrase "$\text{cov}(f_*) = K^{**} - K^{*\text{T}}[K + \sigma_n^2 I]^{-1} K_*$" and replace with --$\text{cov}(f_*) = K_{**} - K_*^\text{T}[K + \sigma_n^2 I]^{-1} K_*$--.

Signed and Sealed this
Second Day of January, 2024

Katherine Kelly Vidal
*Director of the United States Patent and Trademark Office*